United States Patent
Rickards, III et al.

(10) Patent No.: US 7,152,220 B2
(45) Date of Patent: Dec. 19, 2006

(54) COLLABORATION ENGINE: ADDING COLLABORATION FUNCTIONALITY TO COMPUTER SOFTWARE

(75) Inventors: William S. Rickards, III, Sharon Hill, PA (US); Gary S. Keorkunian, North Wales, PA (US)

(73) Assignee: SenseMaking Technologies Corp., Haddonfield, NJ (US)

( * ) Notice: Subject to any disclaimer, the term of this patent is extended or adjusted under 35 U.S.C. 154(b) by 280 days.

(21) Appl. No.: 09/733,800

(22) Filed: Dec. 9, 2000

(65) Prior Publication Data

US 2002/0107994 A1 Aug. 8, 2002

(51) Int. Cl.
*G06F 9/45* (2006.01)
(52) U.S. Cl. .................... 717/101; 719/316
(58) Field of Classification Search ............ 717/106, 717/100, 101; 706/11; 709/202
See application file for complete search history.

(56) References Cited

U.S. PATENT DOCUMENTS

| | | | | |
|---|---|---|---|---|
| 5,515,491 A * | 5/1996 | Bates et al. | ................ | 715/754 |
| 5,664,189 A * | 9/1997 | Wilcox et al. | ............... | 707/205 |
| 5,819,243 A * | 10/1998 | Rich et al. | .................... | 706/11 |
| 5,913,061 A * | 6/1999 | Gupta et al. | ............... | 709/310 |
| 5,974,392 A * | 10/1999 | Endo | ............................ | 705/8 |
| 5,990,810 A * | 11/1999 | Williams | .................... | 341/51 |
| 6,065,039 A * | 5/2000 | Paciorek | .................... | 709/202 |
| 6,104,869 A * | 8/2000 | Minoya et al. | ............. | 709/204 |
| 6,115,640 A * | 9/2000 | Tarumi | ....................... | 700/99 |
| 6,202,070 B1 * | 3/2001 | Nguyen et al. | .......... | 707/104.1 |
| 6,279,031 B1 * | 8/2001 | Kawasaki et al. | ......... | 709/207 |
| 6,332,150 B1 * | 12/2001 | Khan et al. | ................. | 715/526 |
| 6,507,845 B1 * | 1/2003 | Cohen et al. | .............. | 707/100 |
| 2002/0052932 A1 * | 5/2002 | Curtis et al. | ............... | 709/218 |

\* cited by examiner

*Primary Examiner*—John Chavis

(57) ABSTRACT

The present invention disclosed comprises a method for easily adding collaboration functionality to new and existing software. The invention allows seamless collaborative operations at the whole product level, but very importantly, comprises a method for dividing monolithic work products, such as, but not limited to, documents into physical and logical subsets of the work product. In another major aspect of the invention, there is a method that enables separate control of actions within the complete or subsets of the divided work product. These methods to divide normally monolithic work products and determine what actions can occur within these subsets of the work product enable a number of other processes that are additional aspects of the invention.

11 Claims, 23 Drawing Sheets

Collaboration Engine Structure

COLLABORATION ENGINE: ADDING COLLABORATION FUNCTIONALITY TO COMPUTER SOFTWARE

TECHNICAL FIELD OF THE INVENTION

The present invention pertains in general to computer software, and more particularly, to adding collaboration functionality to software so that more than one person can work anytime, anyplace within the work products that are created with software.

BACKGROUND OF THE INVENTION

Organizations are searching for ways to work "smarter" and "faster." As work is becoming more complex within more dynamic environments, teams must make sense of the situation by creating shared understanding and producing knowledge-work products, such as, but not limited to, documents and presentations. Table A lists the requirements of collaboration-enhancement products.

TABLE 1

Requirements of Groupware to Naturally Support Team Collaboration Limitations in the Current Situation

| Requirement: | Supporting Statement: |
|---|---|
| Improve productivity | Reduce cycles through process; shorten cycle time to market |
| | Produce faster consensus-building |
| | Generate reports and presentations directly from collaborative activities |
| | Directly link to underlying thinking from generated reports |
| | Be able to include remote participants in same time sessions |
| | Require little or no training to use tools |
| Improve problem-solving | Bring larger numbers of people (enterprise-wide) into the resolution of a problem in a more manageable way |
| | Obtain higher quality feedback and ideas from diverse groups of people quickly and frequently to shape solutions |
| | Create ad hoc problem-solving sessions as virtual meetings that involve participants in their own time (zones) |
| Enhance creativity | Facilitate the collection and processing of ideas wherever talent resides in the organization |
| | Get more ideas (especially new product ideas), evaluate/sort them, develop alternatives, develop new products, etc. |
| Operationalize Learning Org. | Capture activities being undertaken by any groups anywhere in the world |
| | Capture corporate memory |
| | Integrate with most common desktop products for easy access to "corporate memory" |

The major limitation of current collaboration technologies is that they are tool-centric, i.e., the tool is used within its own separate environment and the output of the process is based on the functionality of the tool. The disadvantages of a tool-centric approach are:

Limited integration with existing infrastructure and legacy systems
  Limited leveraging of existing domain and computer technology knowledge
  Cost of ownership higher:
    Learning costs high
    Administrative costs high: deploying, updating, etc.
    Requires new administrative training and/or personnel.
  Existing and forthcoming technologies for creating, editing, and distributing shared work products developed with a computer such as, but not limited to, documents, spreadsheets, presentations, software, etc. have major differences with the Collaboration Engine invention to be subsequently described.

1. Conceptually, for the most part, non-Collaboration Engine technologies view the work product, such as, but not limited to, a document as a monolith. For example, while one can cut and paste, and embed objects in the document, the level of granularity is still at the document level. Documents are stored as files. When one person edits a work product, such as, but not limited to, a document, others are prevented from editing the work product at the same time.

2. Existing non-Collaboration Engine technologies implement the sharing of work products, such as documents by placing them in some space that can be shared by others. For example, in Windows, one can allow the sharing of a directory, and if one person opens up the document, Windows prevents one from opening up another copy, except in read-only mode. In a growing web-based environment, one still has a repository where one, who has permission, can check-out a document from a centralized storage area, usually a file server at a web-site. Others can not work on this document until it is returned to the central source.

These architectures support the way people currently handle shared work products. This is the classic automation of manual work processes. One reason the manual process of routing documents sequentially predominated was, because until Collaboration Engine, there was no easy way for more than one person to view and edit a work product such as, but not limited to, a document at the same time. Certainly with pen and paper technology there was no way to easily subdivide a document so that it could be simultaneously be created by more than one person. Office automation products have just automated the filing cabinet, where a folder is removed and routed.

The other way that people deal with the inefficiency of routing is for one person to send out multiple copies of the same work product, such as, but not limited to, a document. Each person who receives the document then makes changes to the document separately. It is then up to the person who sent the document to reconcile these differences in a somewhat arduous and tedious manner. Even if the document contains sections that each person works on separately, it is still up to the coordinator to cut and paste these changes into the master document. For example, a research group is creating a document that both summarizes the research goals and accomplishments for the group and has separate sections for each researcher to fill in (and this information is constantly changing). Either the master document is routed sequentially, or the changes are made simultaneously on duplicate documents and someone reconciles the changes.

SUMMARY OF THE INVENTION

As noted earlier, for the most part, non-Collaboration Engine technologies view the work product, such as, but not limited to, a document as a monolith. For example, while one can cut and paste, embed objects, or link to objects external to a document, the level of granularity is still at the whole work-product level, such as the document level. Documents and other work products such as presentations, software code, designs, spreadsheets, etc. are stored as files. When one person edits a work product, such as, but not limited to, a document, others are prevented from editing the work product at the same time.

The present invention disclosed comprises a method for easily adding collaboration functionality to new and existing software. The invention allows seamless collaborative operations at the whole product level, but very importantly, comprises a method for dividing monolithic work products, such as, but not limited to, documents into physical and logical subsets of the work product. In another major aspect of the invention, there is a method that enables separate control of actions within the complete or subsets of the divided work product. These methods to divide normally monolithic work products and determine what actions can occur within these subsets of the work product enable a number of other processes that are additional aspects of the invention. It is also important to emphasize that while these processes occur at the segment level, a segment can be of the size of the whole work product itself. It is also important to note that the use of participant is broadly applied to include human and non-human agents. It is also important to emphasize that individuals may find the use of this technology useful in a variety of aspects, not the least of which, as an extremely easy way to provide a central repository of useful information that is readily available anywhere in the world and accessible through software they currently use. In addition, other processes that are aspects of this invention include, but are not limited to, the following:

1) The aspect of adding collaboration functionality to software so multiple people can more effectively and naturally work on the same work product anytime, anyplace. It should be noted that anytime, anyplace obviously includes the subsets of same time, same place; same time, different place; same place, different time; and different time, different place. Although not limited to the following, the major collaborative work activities supported through the Collaboration Engine Process include: project and work product management; shared work product creation and editing; and the capture of discussions and support statements related to the development of the shared work product.

a) An additional aspect of this invention is the process currently incorporated within, but not limited to the current manifestation, Collaboration Engine technology that automatically recognizes when another person begins to work on the same work product and can provide automatic control and updates to other participants who log on and begin to work on the same work product.

b) In the current manifestation, but not limited to this manifestation, of this process, participants interact with the shared work product enabled by the Collaboration Engine through the Collaboration Engine Interface. Currently, the Collaboration Engine Interface can be subdivided into two major ways that end users interface with Collaboration Engine Components. First is through a Collaboration Explorer that is placed in a docked window and the second is through the use of short cut menus directly within the shared work product. The Collaboration Explorer is used as a simple, intuitive, natural interface to manage such things as, but not limited to, projects, participants, and shared work products. However, there is no limit to the variety of ways that human and non-human agents could interact with the collaboration server to effect useful storage of a variety of data of all types and formats. For example, segments can be displayed in a web browser, converted to speech but still managed and persisted through the Collaboration Engine Component as any other segment, i.e., the media being stored and manipulated can be any media reducable for presentation and storage by a computing device or the interface can be altered and this still fits within the invention being described.

c) As noted earlier as a major aspect of this invention, the ability to identify and control separately the actions within segments of the divided work product enables collaborative interaction within a given work product by the ability to capture where a particular user is within a shared work product. The Key Capture Component captures key strokes and this information is passed to the Collaboration Handler which determines the allowed actions that a participant may perform at the time with the shared work product. The Collaboration Handler initiates actions with and responds to actions from both the Collaboration Explorer and directly through the shared work product. The Collaboration Engine Server interacts with a database in a conventional manner to persist information.

2) Another aspect of this invention is that these processes can occur truly anytime, anyplace, offline, i.e., not connected to another computer, or online.

3) Another aspect of this invention is the process whereby work that is performed on segments offline is automatically synchronized with existing work when transitioning to online work.

4) Another aspect of this invention is the process whereby one participant who does not have control of a segment can create suggested alternatives for that segment.

5) Another aspect of this invention is the process whereby a segment can have multiple versions created and loaded on demand. The participant who has control of a segment can accept versions in such a way that only the version of the segment is replaced and no other segments are affected.  6) Another aspect of this invention is the process whereby a current work product with segments can have the latest version retrieved from the source that persists information in such a way that any segments under control of the participant is not overwritten.

7) Another aspect of this invention is the process whereby the participant who has control of a segment can accept alternatives in such a way that only the alternative of the segment selected is replaced and no other segments affected.

8) Another aspect of this invention is the process whereby one participant who does not have control of a segment and is working offline on this section transitions to working online. There is a process that recognizes changes to this segment and automatically takes these changes as a suggested alternative for the segment while not overwriting what currently exists in the persisted states such as, but not limited to, a database. This is a powerful enabling process that combines processes 3 and 4 above: offline actions to segments not under control of an agent can be discerned when moving to an online mode and the agent is given the option of creating these actions as alternatives to existing work. The creation of these alternatives causes no changes to the work product not under the control of the agent and can provides notification, in a variety of means to the agent or agents, who may have control of these segments.

9) Another aspect of this invention is the process to only work on part of a work product at a time. For example, a segment can be downloaded from another source and work can proceed on this segment alone without knowing about or accessing any container section. For example, a powerful mobile device, such as, but not limited to, a wireless handheld device could work on just one segment without having the whole work product, such as, but not limited to, a document downloaded. For a specific example, a human or non-human agent may receive a price change which is a segment to a sales contract, this agent could then modify this price and/or provide an electronic signature to the change. The work could be performed on the handheld device and then saved back to a central site to be incorporated, or the mobile device could be used strictly as an input device where the collaboration engine software is running on a central site.

10) Another aspect of this invention is the process where a segment can be further subdivided into segments. Another related aspect of this invention is the process where segments can be aggregated into a segment that contains these segments 11) Another aspect of this invention is the process where security and permissions can be applied to each segment separately. For example, one segment can be writable for a certain participant while another is not, i.e., there can be permissions for the human or non-human agent that determine a various set of actions that be performed on a segment.

12) Another aspect of this invention is the process where one can control what segments of a container are downloaded or transferred with a container segment. For example, from another computer only the parts outside the segments within a container could be downloaded. This could be done on a demand basis and the benefits of this are many:
   a) Reduced bandwidth to transmit this portion.
   b) Less storage space and processing needed at the receiving end allowing for smaller and more portable devices.
   c) Higher level of security—only portions that were permitted to be transferred or downloaded would be transmitted. For example outside a given physical or transmission area, certain segments could not be transmitted.

13) Another aspect of this invention is the process where one can control what segments of a container are stored. For example, it may reduce storage techniques if the segments are stored only once and then recombined dynamically as their container segment is loaded, instead of storing segments with the container.

14) Another aspect of this invention is the process where there can be more directed "push" and "pull" of segments. For example, many times not all participants need to know everything or when there is a change. Having the ability to divide monolithic work products, when some participant wants to notify others of a change, then these changes can be "pushed" in a more specific away that will reduce information overload for those receiving. On the other hand, some participants may want to be specifically notified when a particular section is changed. This process could entail such things as sending some notification, such as, but not limited to, emails when a modification to a segment has occurred. On the receiving end this process could include automatic retrieval of the segment when clicked-on by the receiver of such notification. In addition on the pull side, human and non-human agents 15) Another aspect of this invention and related to the last aspect, is the process where there is greater management control of who has read a particular segment. The date and time of reading a segment or an "electronic signature" could be used to record when a participant has acknowledge when a change has occurred.

16) Another aspect of this invention is the process of initiating workflow actions at the segment and not just the whole work product level.

17) Another aspect of this invention is the process of applying project management actions at the segment and not just at the whole product level.

18) Another aspect of this invention is the process whereby logical segments can be created within a work product. While many, but not all of the processes, described above would be available, the process to create logical segments enable powerful additional aspects of this invention:
   a) Different views of the same document could be afforded for different participants. Whereas there can only be one physical division of a work product, there can be many logical divisions of a work product. For example, this process may allow different participants or the same participant to logically divide up a work product in different ways
   b) Depending on the privileges identified for a work product or segment, only logical segments identified by a particular participant could be presented to that participant.
   c) This enables the process to relate different logical and/or physical sections together. For example, one section of the document may be related and identified as a cause for another section.

19) Another aspect of this invention is the process whereby new subsets of the existing work product are created without creating physical or logical segments of this particular work product. For example, it may be useful to create new work products from subsets of an existing work product by some means such as, but not limited to, highlighting some subset, then creating a new work product that is created part of this or some other project. This relates to a degree to the description of the process in 20a below, but adds the concept of simple reusability of segments and their manifold relationships.

20) Another aspect of this invention is the process where segments of the same and/or different work products could be related in a logical way. This process would enable, but not be limited to the following:
   a) This ability to relate logical and/or physical sections is a powerful way to dynamically create record-structures by non-programmers, programmers, and/or non-human agents. Currently, database records are static descriptions of related attributes and creating these structures requires extra substantial training. However, at a logical level, these structures are just related, persistent attributes. Since segments are individually created and persist, multiple logical records can be created easily by programmers, non-programmers, and/or non-human agents who just need to identify the segment and the logical connection of these segments. Along with this, the ability to duplicate a segment could allow to duplicate all structures of the segment. This permits a simple method to "add" records. In this case, the adding of records can be of a physical and logical level.

b) Related logical segments could be navigated through some interface like, but not limited to Collaboration Explorer. Navigation only mode would cause a jump to these segments of any type, including, but not limited to multi-media. For example in a related chain, one logical segment could be a film clip, another a cell in a spread sheet, another a figure in a diagram.

c) Related logical segments could be combined for display, printing out, or storage as an output file.

21) Another aspect of this invention is that the process can be implemented in a variety of means. For example the processes incorporated within collaboration engine technology can be used on, but not limited to, the following:

a) a single machine and single user where there are advantages to dividing work products into segments, b) peer-to-peer, c) client-server, d) over LANs, intranets, and the internet, e) within application service providers that provide these processes to participants.

22) Another aspect of this invention is the process whereby offline work occurs. Currently, offline work is the ability to work with a copy of the work product that is recognizable by the application and where one is not using Collaboration Engine Technology. For example, one can work with a local copy of a Living Document within Word without being connected to a Collaboration Engine. However, aspects of this invention includes working offline whereby everything is the same as working online except there is no connection with other participants and information is persisted locally, such as, but not limited to, a local database. When transitioning to online, the locally persisted information would be synchronized with the central location that is being used to persist information for the project. For example, one could use a replicated database structure whereby when transitioning to online, the database automatically updates databases within the existing network structure.

23) Another aspect of this invention is the process whereby persistence of the data is just incorporated with the existing file structure.

24) Another aspect of the this invention is the process where segments that are created are associated with some template of metadata. For example, assume that some physical or logical section is created within a document for the purpose of creating notes. Information such as page, author of work product, etc. would be automatically associated with this. Comments on the note could be created as explanatory drilldown notes.

25) Another aspect of this inventions is the process where segments can have additional processes applied to them. For example, a logical or physical segment that has alternatives associated with them could have votes associated with the alternatives. The alternative receiving the highest votes could automatically replace existing segment. The aspect of the invention that is important here is the integration of application of additional processes, such as, but not limited to, voting, multi-criteria decision analysis, weighting, etc.

26) Another aspect of this invention is the process where templates of work products with existing segments can be used in novel situations.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
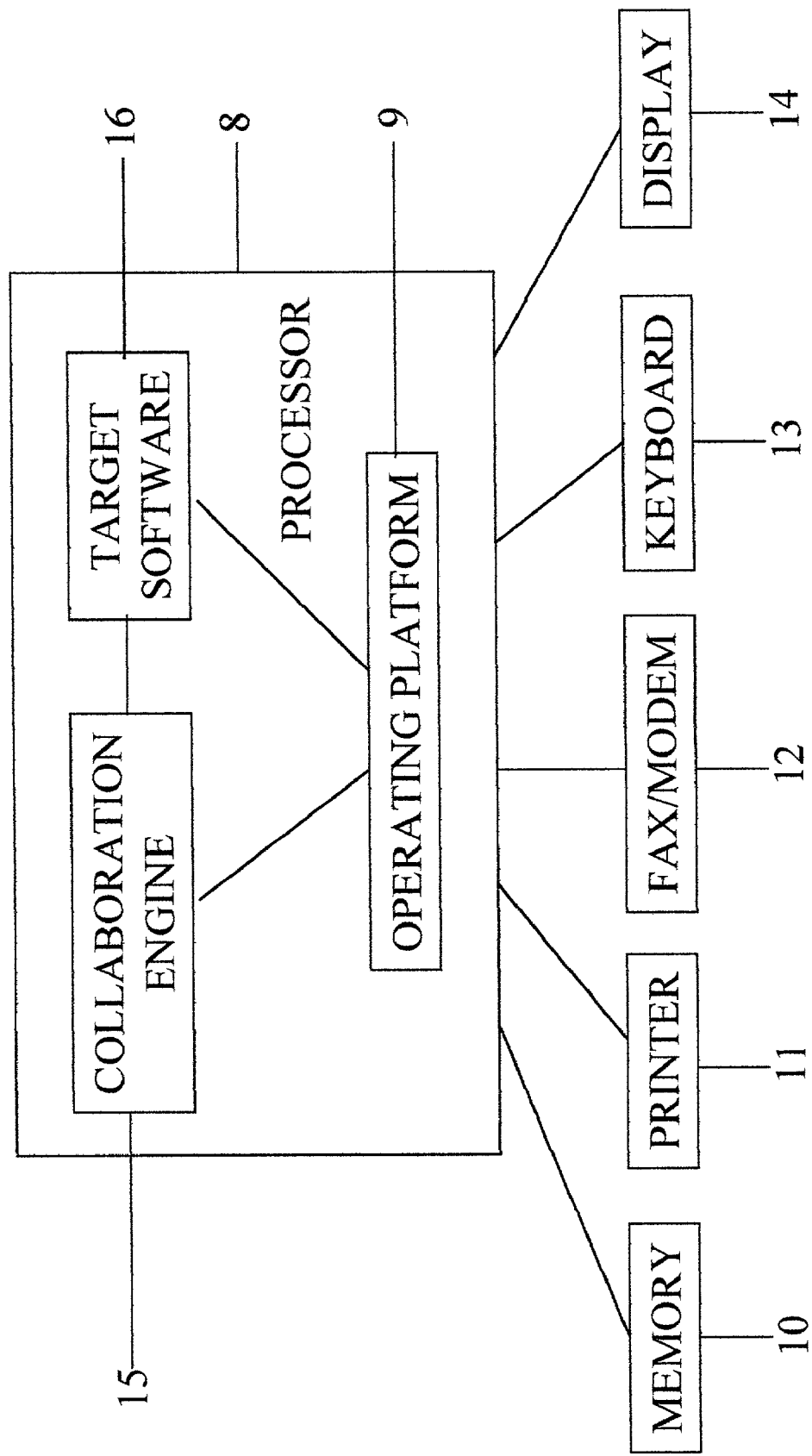
FIG. 1. illustrates an overall block diagram of the system of the present invention.

Referring now to FIG. 1, there is illustrated Collaboration Engine run in a general processor-based computer 8, which can be any type of conventional, all-purpose, digital computer, which will be referred to subsequently as "computer,"

that is capable of running Collaboration Engine. The computer 8 has associated with it the necessary hardware to execute various instructions associated with application programs. These typically require some type of processor, the circuitry required to run the processor, memory, both Random Access Memory and Mass Storage Memory in the form of hard disks, and input/out structure. The computer 8 is operable to receive instructions external to the processor from a peripheral device such as a keyboard 13 to load a program from an external memory device 10 into operating memory (not shown).

The system of the present invention is basically comprised of Collaboration Engine 15 which operates on an operating platform 9 and adds collaboration functionality to target software 16 which also operates on an operating platform. In the present embodiment, the operating platform is a Windows™ platform that in general provides for control of the majority of the input/output devices, etc. This is a conventional, widely used operating platform, however, Collaboration Engine 15 can be applied to a variety of operating platforms. The operating platform 9 is operable to interface with an external printer 11, a FAX/modem device 12, a keyboard 13, and a display 14. Again, this operation is conventional.

Figure 2:
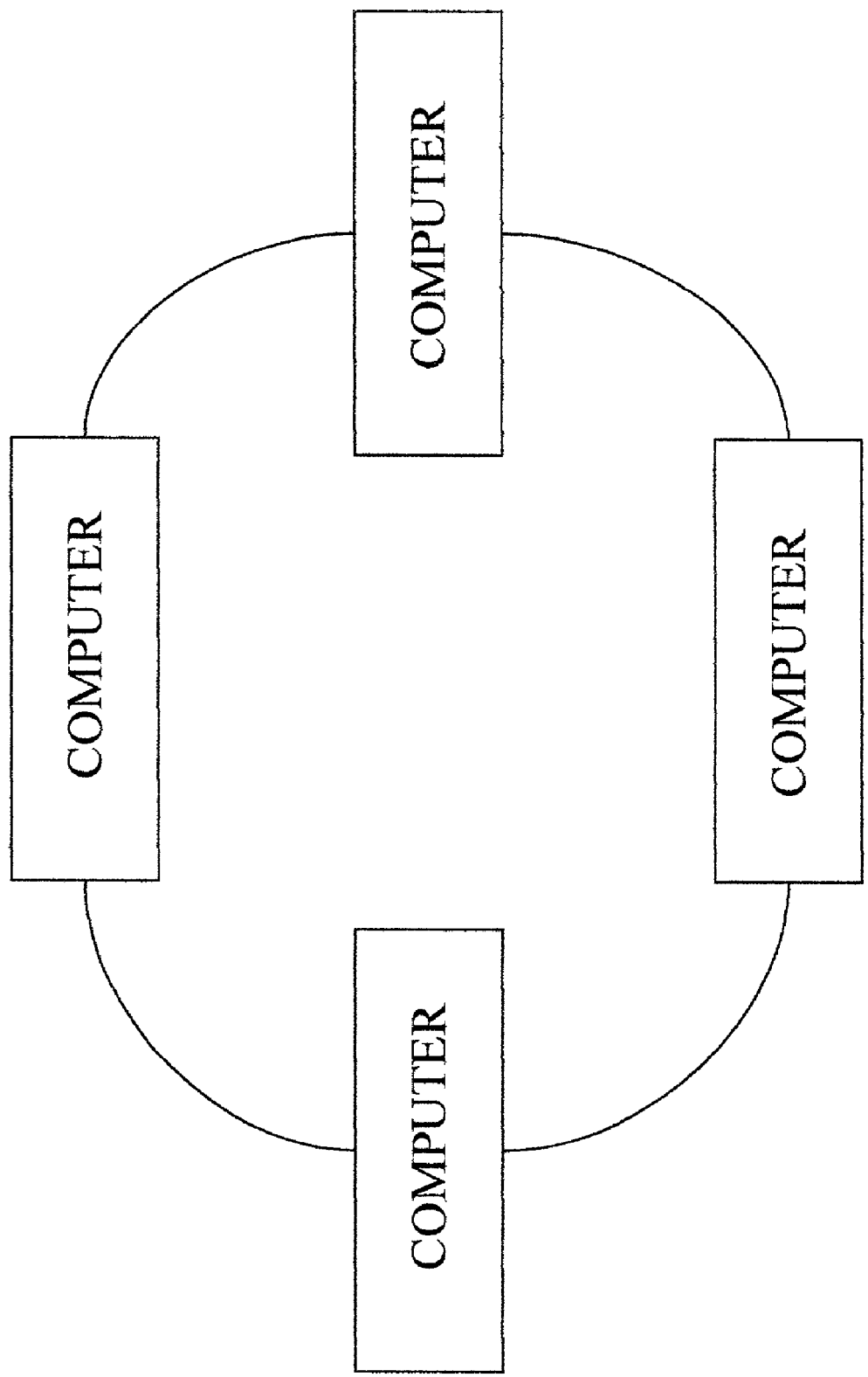
FIG. 2. illustrates an overall block diagram of a network of computers.

Collaboration Engine 15 can be used as a stand alone program on a single computer, referring now to FIG. 1, but can also be run on a computer as a server which can provide services to other computers that are connected to it via some connection such as, but not limited to, a local area network, internet, intranet, etc., referring now to FIG. 2. Collaboration Engine 15 runs on a digital computer in such a way that any computer can act as a server to other computers as long as the computers are connected in some way so that data can be transmitted among computers.

Figure 3:
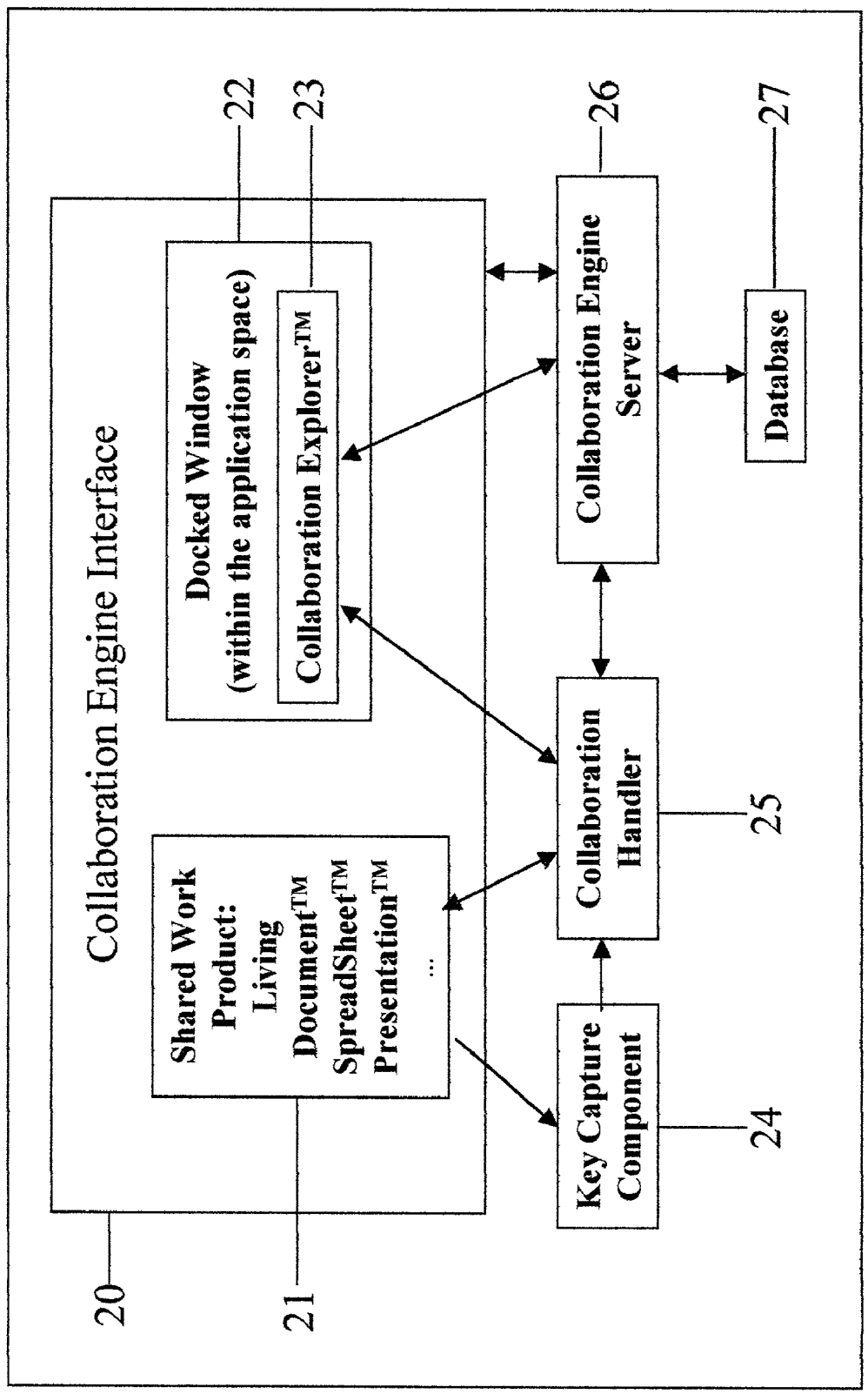
FIG. 3. illustrates the components of Collaboration Engine that perform various functions that add collaborative functionality to the target software.
Figure 22:
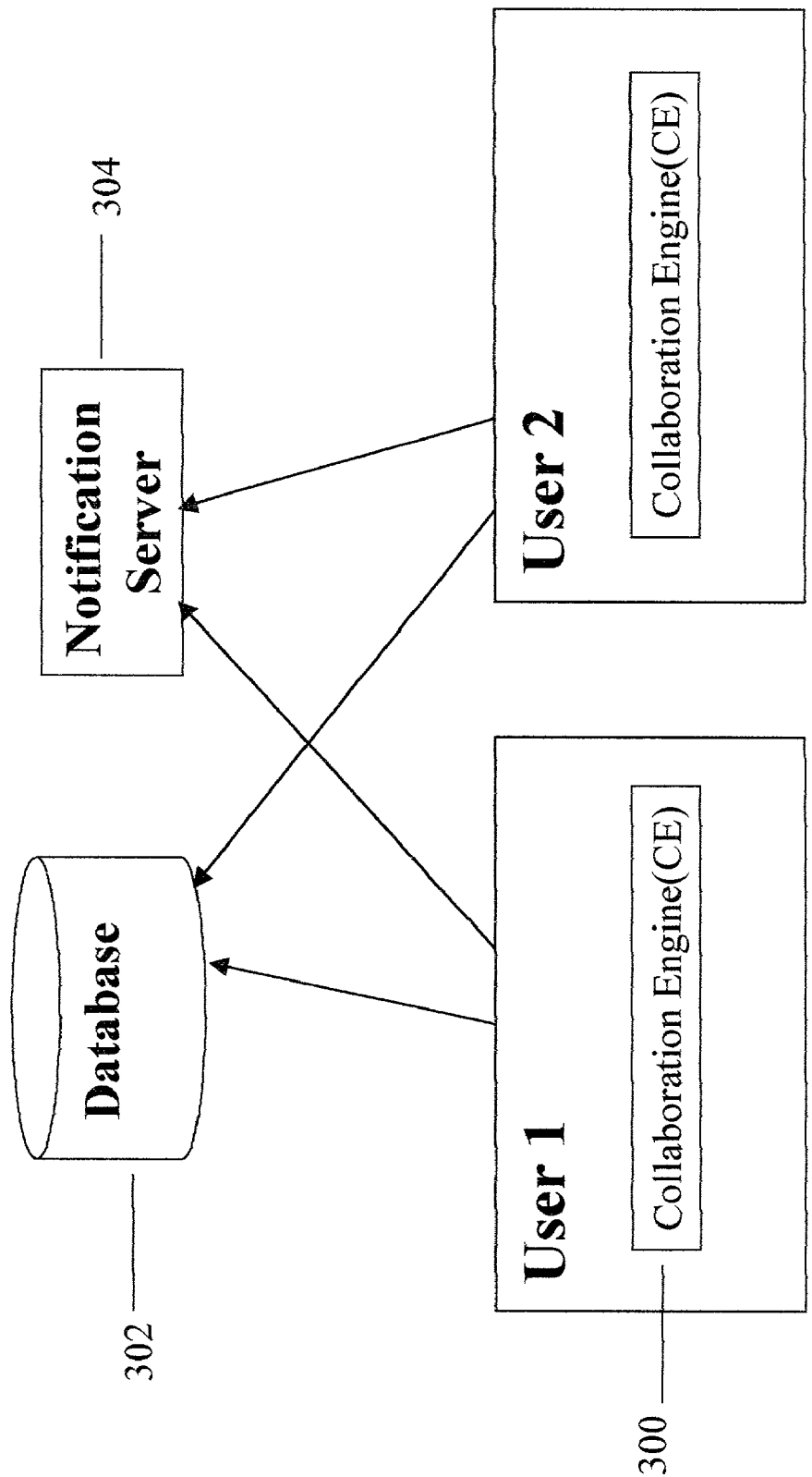
FIG. 22 illustrates an expanded view of the Collaboration Engine Structure.

Collaboration Engine 15 operates over the operating platform 9 and requires the operating platform 9 in order to operate. Collaboration Engine 15 is made up of components that work in concert to provide collaboration functionality to target software 16. Referring now to FIG. 3, there is illustrated a diagram that shows the components of Collaboration Engine that perform various functions that add collaborative functionality to the target software. The end users interact with the shared work product enabled by Collaboration Engine through the Collaboration Engine Interface 20. The Collaboration Engine Interface can be subdivided into two major ways that end users interface with Collaboration Engine Components. First is through a Collaboration Explorer 23 that is placed in a docked window 22 and the second is through the use of short cut menus directly within the shared work product 21. A shared work product can be anything presentable in at least one dimension by some output device, this means it is media independent. A shared work product that is modified so more than one person can collaborate in the creation of the work product is prefaced with the word "Living," for example, a document modified for collaborative use is called a Living Document, a spreadsheet modified for collaborative use is called a Living SpreadSheet, a presentation modified for collaborative use is called a Living Presentation, etc. A major innovation that allows collaborative use is the ability to capture where a particular user is within a shared work product. The Key Capture Component 24 captures key strokes and this information is passed to the Collaboration Handler 25 which determines the allowed actions that the end user may perform at the time with the shared work product. For example, if the end user types the letter "t", the key capture component captures this information and the Collaboration Handler 25 determines whether the letter "t" should be permitted to be typed and displayed or ignored. The Collaboration Handler 25 also receives commands from the "Living" shared work product 21 and processes these commands, and this process will be described in more detail later. The Collaboration Handler 25 receives similar commands from the Collaboration Explorer 23 and processes these commands in a similar way to the commands received from the "Living" shared work product 21. The Collaboration Handler 25 initiates actions with and responds to actions from the Collaboration Engine Server 26 which will be explained in more detail later. There is a login process where the Collaboration Engine Interface 20 interacts with the Collaboration Engine Server 26. The Collaboration Explorer 23 is used as a simple, intuitive interface to manage projects, participants, and shared work products and will be discussed in more detail later on. The Collaboration Engine Server 26 interacts with a database in a conventional manner to persist information. Referring now to FIG. 22, there is illustrated a diagram that shows an expanded view of how Collaboration Engine 300 interacts with a storage medium 302 that is sharable with other clients and the notification server 304 that provides updates to all collaboration engines connected to the notification serer. Where the collaboration engine, database, and notification server reside is fairly independent. For example, they can all reside on a single machine for single user operations, they can all reside on different machines. For example, a collaboration engine for a user may be running on one machine and the user is providing input to this instance of the collaboration engine with some input device.

Figure 23:
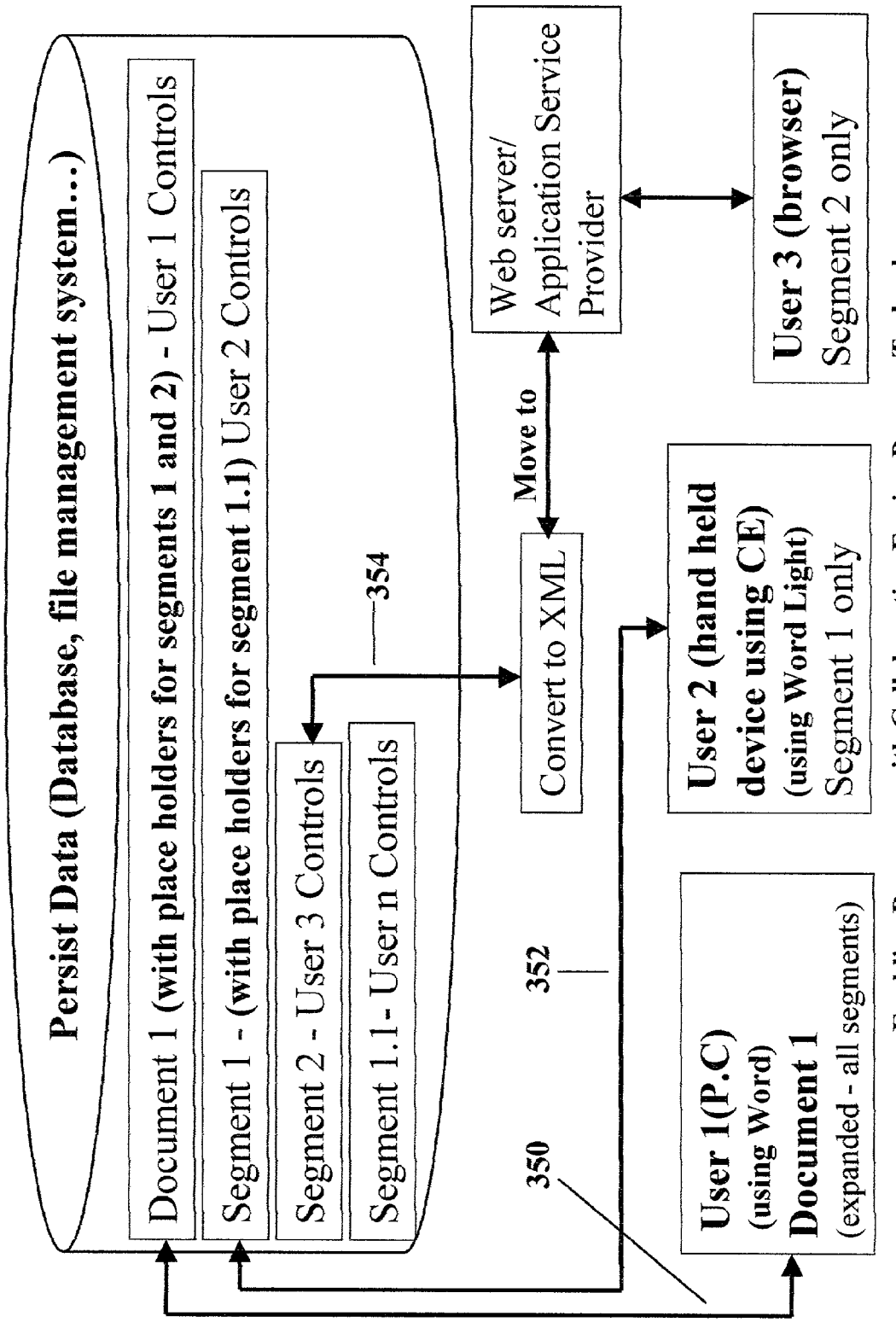
FIG. 23 illustrates an a sample of enabling processes with collaboration engine process technology.

Referring now to FIG. 23, there is illustrate a diagram that shows the general idea of how segmenting the work product permits a variety of interactions while still maintaining the integrity of the work product. The first illustrated method 350 is where the whole document is presented to a display on a typical PC. All segments are expanded and user 1 controls the document, this is the area outside all existing segments. The second illustrated method 352 is where User 2 gets only segment 1 downloaded and can modify this in a manner that will update segment 1 and will update user 1's whole view of the document in a seamless manner. A variation of 352 could be where the mobile device is only being used as an input and display device and the collaboration engine on another machine determines the actions that the user can perform. The third illustrated method 354 is where user 3 is working on segment three through a browser. Any changes that user 3 makes will be automatically and seamlessly integrated in the software product. Obviously, these output and input devices could be anything and not just limited to the devices shown here for illustration.

Figure 4:
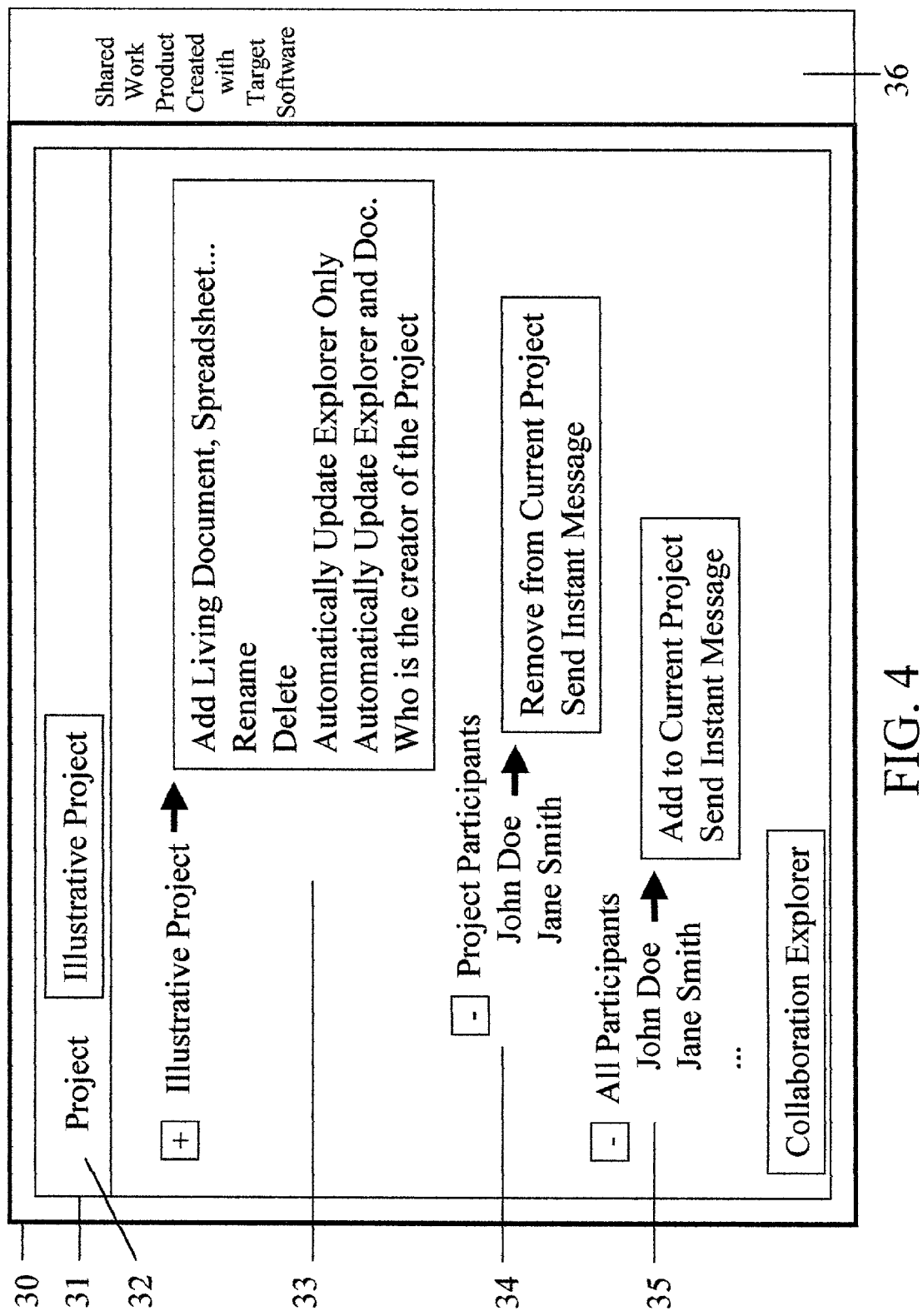
FIG. 4 illustrates those activities related to project and work product management.

It is useful to illustrate the invention by viewing the interface as supporting several major collaborative work activities: project and work product management; shared work product activity; and discussions and support statements related to the development of the shared work product. Referring now to FIG. 4, there is illustrated a diagram of a display of Collaboration Explorer when Collaboration Engine has been loaded and a participant has successfully logged in. FIG. 4 illustrates those activities related to project and work product management. The docked window 30 is docked within the application space. Within this docked window any control can be added. In this case, an explorer like control is added within the docked window 31. The project selected from among projects for which the end user has permission to access are presented in area 32. End users can add projects which will be listed in area 32. Some actions that can be performed on and within a project are listed in area 33. For example, end users can add a shared Living Work Product like a document or spreadsheet which will be displayed on the right side 36, they can also perform actions such as renaming and deleting the shared Living Work Product, among other actions. From this natural interface, end users can add participants to a project 35 and they can remove participants from a project 34. End users can also send instant messages to any participants currently logged in to the system.

Figure 5:
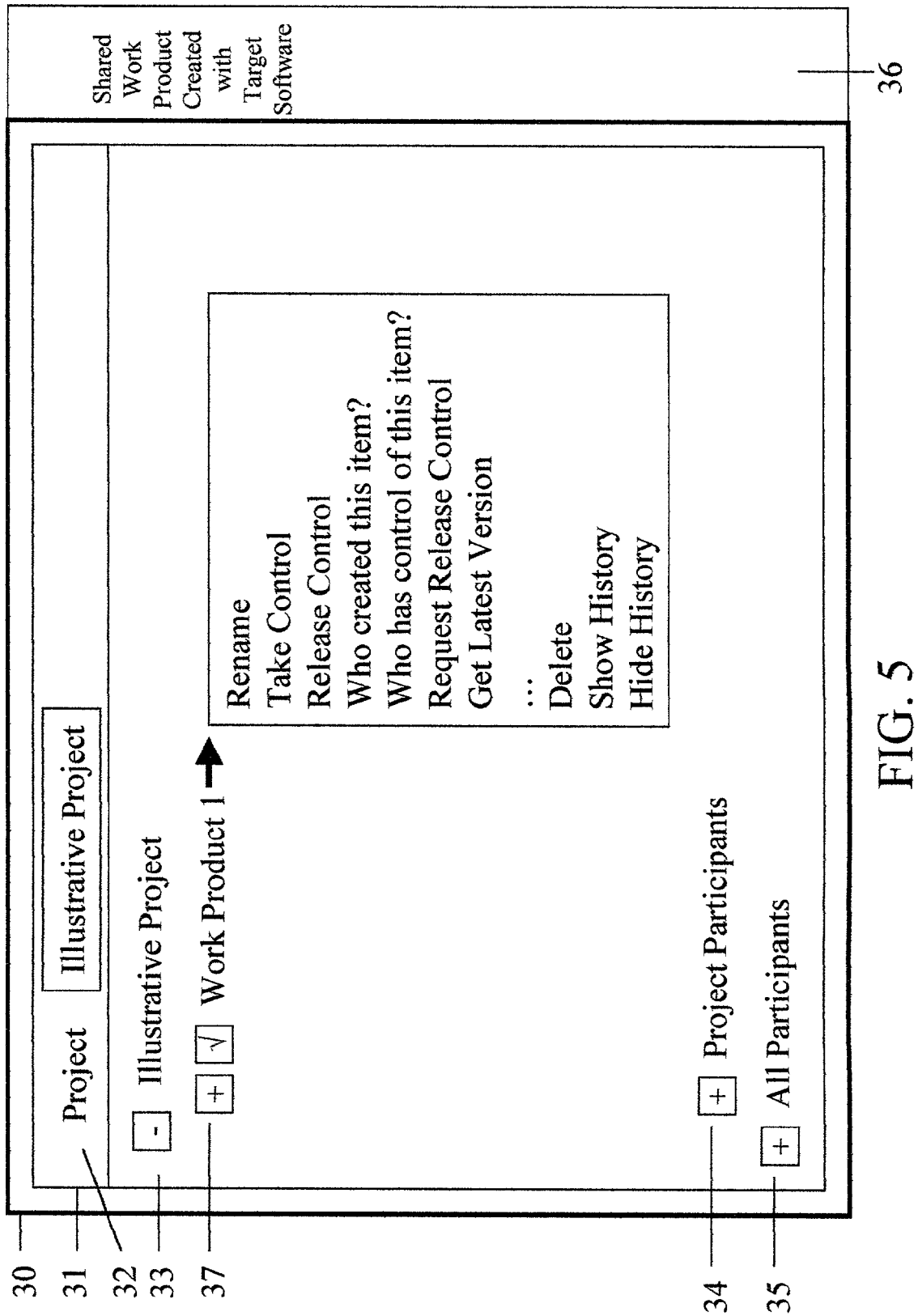
FIG. 5 illustrates those activities related to shared work product activity.

Referring now to FIG. 5, there is illustrated a diagram of a display of Collaboration Explorer when Collaboration Engine has been loaded and participant has successfully logged in. FIG. 5 illustrates those activities related to shared work product activity. In FIG. 5, a shared work product 36 has been added to the project 33 and is a new node in Collaboration Explorer 37. End users can perform actions on the shared work product 36. Some actions that can be performed on a shared work product are listed in area 37. For example, end users can rename a shared work product, take control and release control. To take control means that only the participant who has taken control can perform actions on this node—no other participant can type or perform actions on this node. To release control means that another participant can perform type within the shared work product or perform actions on this node. These actions which will be described in more detail, but what should be noted, is that participants who have control of a shared work product 36 can dynamically subdivide the shared work product so that multiple people can work within the same shared work product at the same time—a major innovation of this invention. So that the actions that can be performed on the shared work product can be performed on these dynamically created sections. Other actions that can be performed include finding out who has control, requesting another participant to release control, getting the latest version from the database, deleting the shared work product, showing a history of changes and hiding a history of changes.

Figure 6:
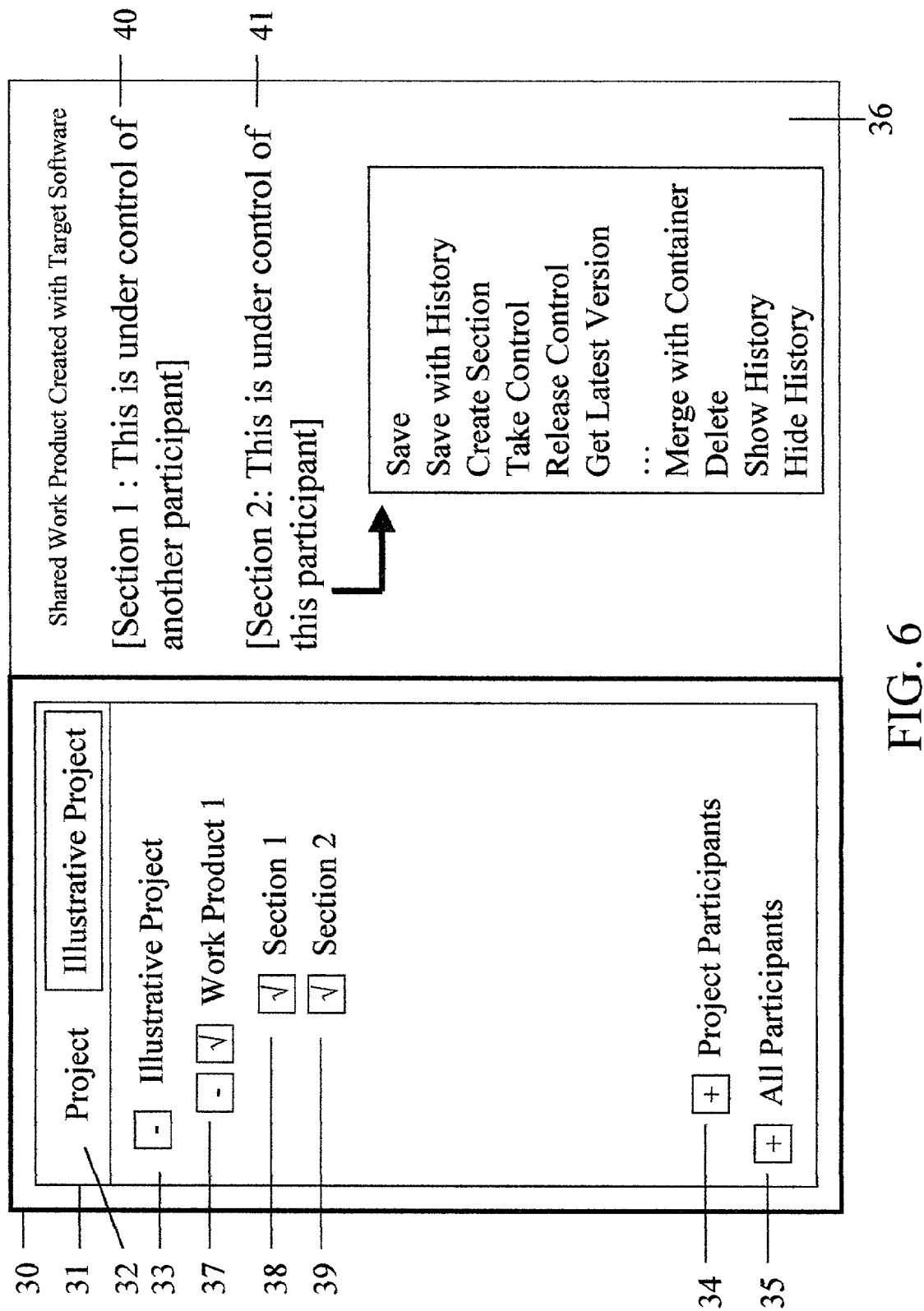
FIG. 6 illustrates those activities related to shared work product activity, focussing on actions on subdivisions of the shared work product.

Referring now to FIG. 6, there is illustrated a diagram of a display of Collaboration Explorer and shared work product spaces when Collaboration Engine has been loaded and a participant has successfully logged in. FIG. 6 also illustrates those activities related to shared work product activity, focussing on actions on subdivisions of the shared work product. In FIG. 6, two sections 40, 41 have been dynamically created within a shared work product 36. When these sections were created, nodes named, "Section 1" 38, and "Section 2" 39 were automatically added to the Collaboration Explorer 31. Section 1 (40) is under control of another participant as indicated by a red checkmark within the Collaboration Explorer 38 and Section 2 (41), marked by a green checkmark, is under control of the current participant who is logged in and viewing this shared work product. This participant can perform actions on Section 2 (41) and the areas in the shared work product outside of Sections 1 (40) and 2 (41). Some actions that can be performed on Section 2 (41) are accessed by exposing a short cut menu, in this case, by right clicking. Some actions that can be done from this menu include: Saving the section, saving the section and creating a history of what the section looked like before changing to help with version control of each section. Sections are dynamically created by highlighting within the shared work product 36 and clicking on the option "Create Section." The other actions are similar to the actions on nodes that can be performed from the Collaboration Explorer 31 that were presented in FIG. 5, except when working on a section instead of the whole shared work product, like a document, one can merge a section with the section that contains the section. For example, this participant can merge Section 2 within Work Product 1 which is also under control of this participant, which would remove Section 2 as a separate section which can be taken under control.

Figure 7:
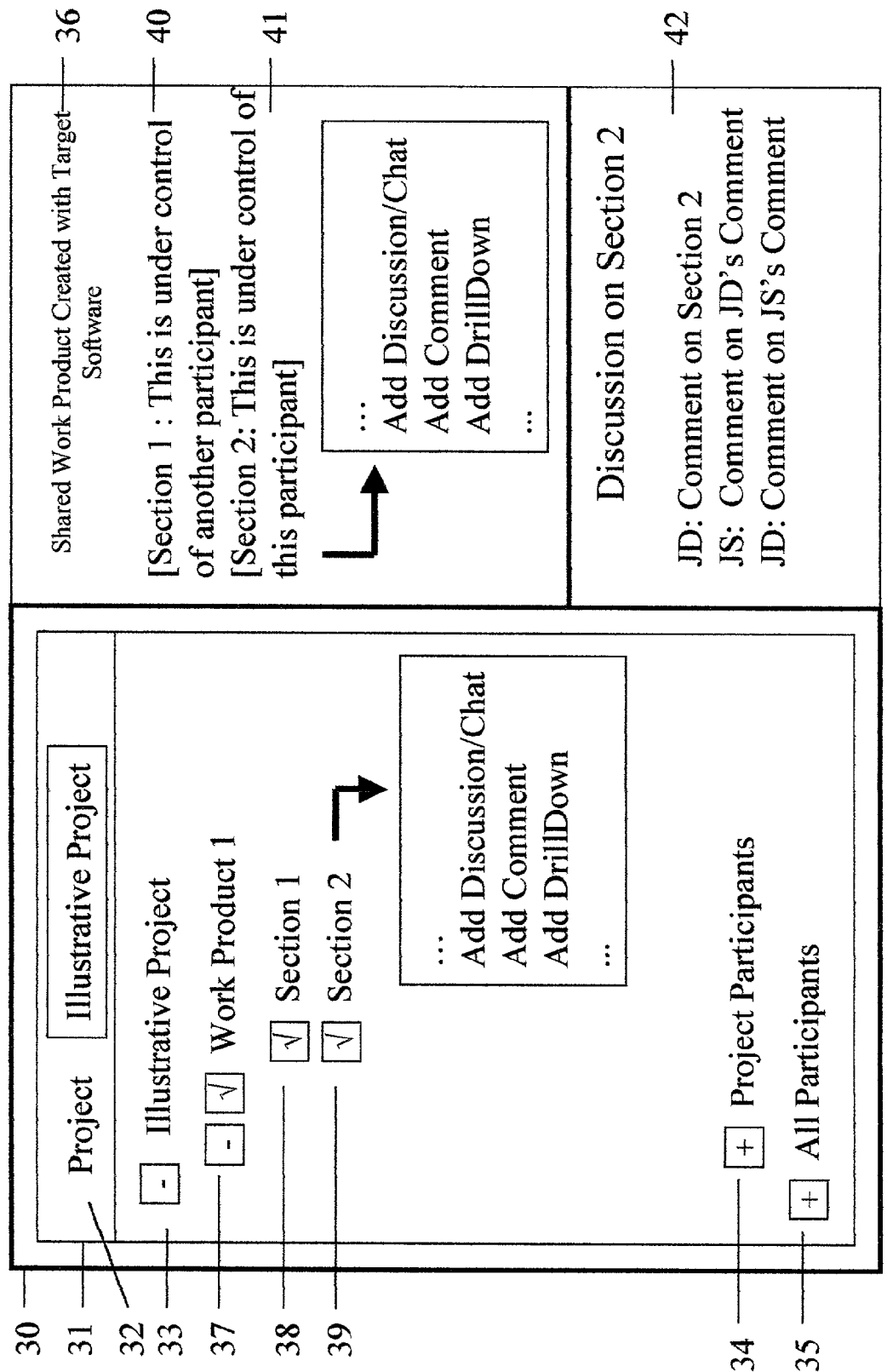
FIG. 7 illustrates those activities related to discussions and support statements relevant to the development of the shared work product.

Referring now to FIG. 7, there is illustrated a diagram of a display of Collaboration Explorer and shared work product spaces when Collaboration Engine has been loaded and a participant has successfully logged in. FIG. 7 illustrates those activities related to discussions and support statements relevant to the development of the shared work product. In FIG. 7, a discussion is added that is associated with the development of the shared work product 42. This discussion can be added by performing actions from the node, Section 2, within the Collaboration Explorer 39, or from the short cut menu associated with Section 2 (41) within the shared work product 41. Other actions that can be performed include: adding comments within the discussion created, and adding drill down documents. Drill down documents are documents with supporting evidence that can be associated with sections within a document.

Figure 8:
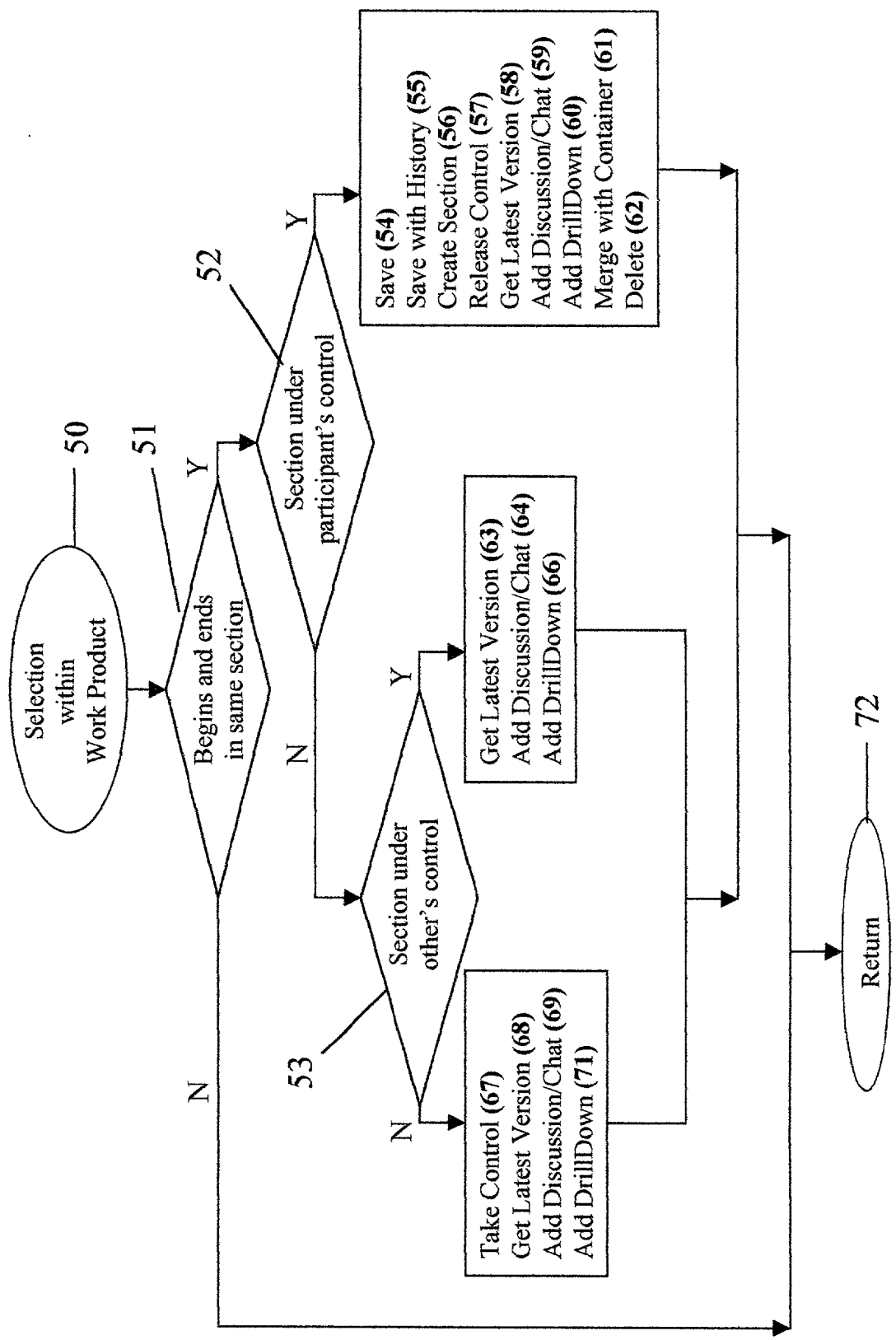
FIG. 8 illustrates a flowchart depicting the operation wherein some part of the work product is selected and the choices of launchable operations available to a participant.

Referring now to FIG. 8, there is illustrated a flowchart depicting the operation wherein some part of the work product is selected. The operation is initiated at a block 50 and then proceeds to a decision block 51. The decision block 51 determines whether the selection begins and ends within the same section. If so, the program would flow along the "Y" path to a decision block 52. If not, the program would flow along the "N" path to the return block 72. Following the "Y" path, the decision block 52 determines whether the section is under the participant's control. If so, the program would flow along the "Y" path for the current participant to select one of the appropriate launch blocks: Save 54, Save with History 55, Create Section 56, Release Control 57, Get Latest Version 58, Add Discussion/Chat 59, Add DrillDown 60, Merge with Container 61 (for selections that are not the work product itself), and Delete 62. If the decision block 52 determines the section is not under the participant's control, then the program would flow along the "N" path to a decision block 53. The decision block 53 determines whether the section is checked out to another participant. If so, the program would flow along the "Y" path for the current participant to select one of the appropriate launch blocks: Get Latest Version 63, Add Discussion/Chat 64, Add DrillDown 66. If the decision block 53 determines the section is not checked out to another participant, then the program would flow along the "N" path for the current participant to select one of the appropriate launch blocks: Take Control 67, Get Latest Version 68, Add Discussion/Chat 69, Add DrillDown 71. After completion of any of these launched subprograms, the program flows to the return block 72.

Figure 9:
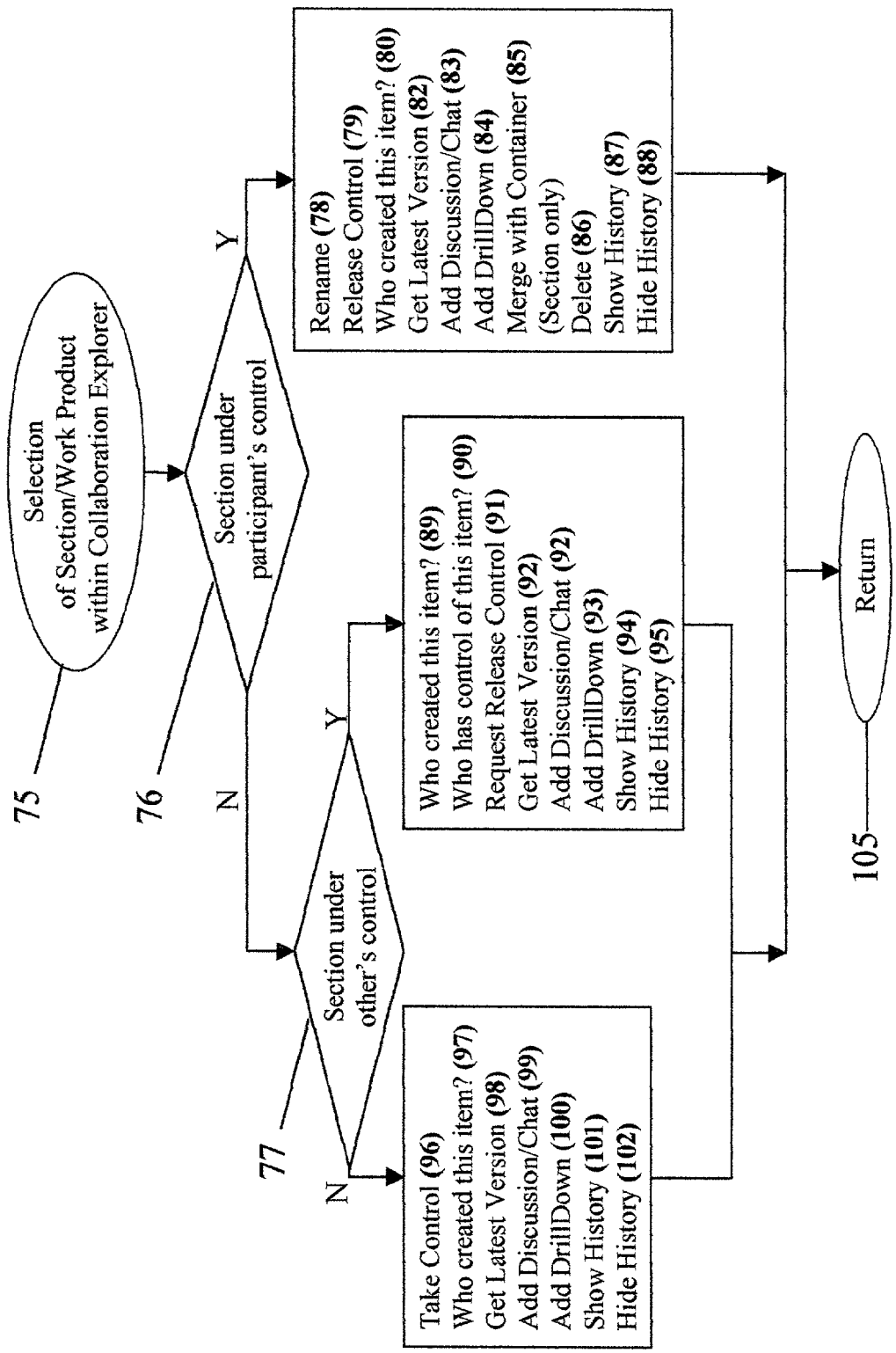
FIG. 9 illustrates a flowchart depicting the operation wherein a section or work product node is selected from the Collaboration Explorer and the choices of launchable operations available to a participant.

Referring now to FIG. 9, there is illustrated a flowchart depicting the operation wherein a section or work product node is selected from the Collaboration Explorer. It is similar to FIG. 8, but some actions are not the same, i.e., there are some things that a participant can do from the work product itself that can't be cone from the Collaboration Explorer and there are some things that can be done from the Collaboration Explorer that can't be done from the work product itself. The operation is initiated at a block 75 and then proceeds to a decision block 76. The decision block 76 determines whether the section is under the participant's control. If so, the program would flow along the "Y" path for the current participant to select one of the appropriate launch blocks: Rename 78, Release Control 79, Who created this item 80, Get Latest Version 82, Add Discussion/Chat 83, Add DrillDown 84, Merge with Container 85 (for selections that are not the work product itself), Delete 86, Show History 87, Hide History 88. If the decision block 76 determines the section is not under the participant's control, then the program would flow along the "N" path to a decision block 77. The decision block 77 determines whether the section is checked out to another participant. If so, the program would flow along the "Y" path for the current participant to select one of the appropriate launch blocks: Who created this item? 89 Who has control of this item? 90 Request Release Control 91, Get Latest Version 92, Add Discussion/Chat 93, Add DrillDown 94, Show History 95, Hide History 96. If the decision block 77 determines the section is not checked out to another participant, then the program would flow along the "N" path for the current participant to select one of the appropriate launch blocks: Take Control 96 Who created this item 97, Get Latest Version 98, Add Discussion/Chat 99, Add DrillDown 100, Show History 101, Hide History 102. After completion of any of these launched subprograms, the program flows to the return block 105.

Figure 10:
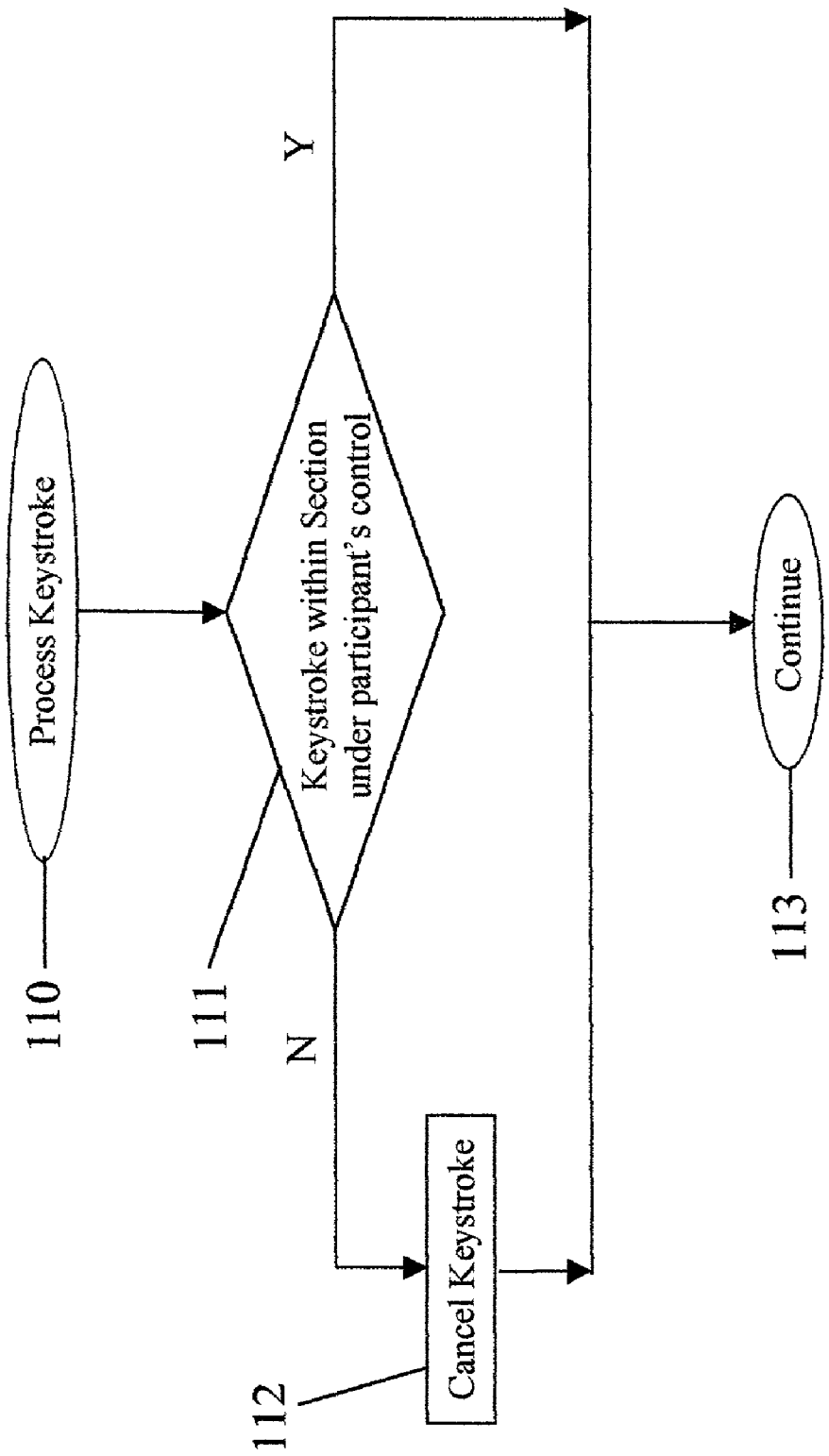
FIG. 10 illustrates a flowchart depicting the operation wherein a keystroke occurs within some part of the work product.

Referring now to FIG. 10, there is illustrated a flowchart depicting the operation wherein a keystroke occurs within some part of the work product. The operation is initiated at a block 110 and then proceeds to a decision block 111. The decision block 111 determines whether the keystroke occurs within a section under the participant's control. If so, the program would flow along the "Y" path to the continue block 113. If not, the program would flow along the "N" path to a function block 112 which will cancel the keystroke. The program would then flow to the continue block 113.

Figure 11:
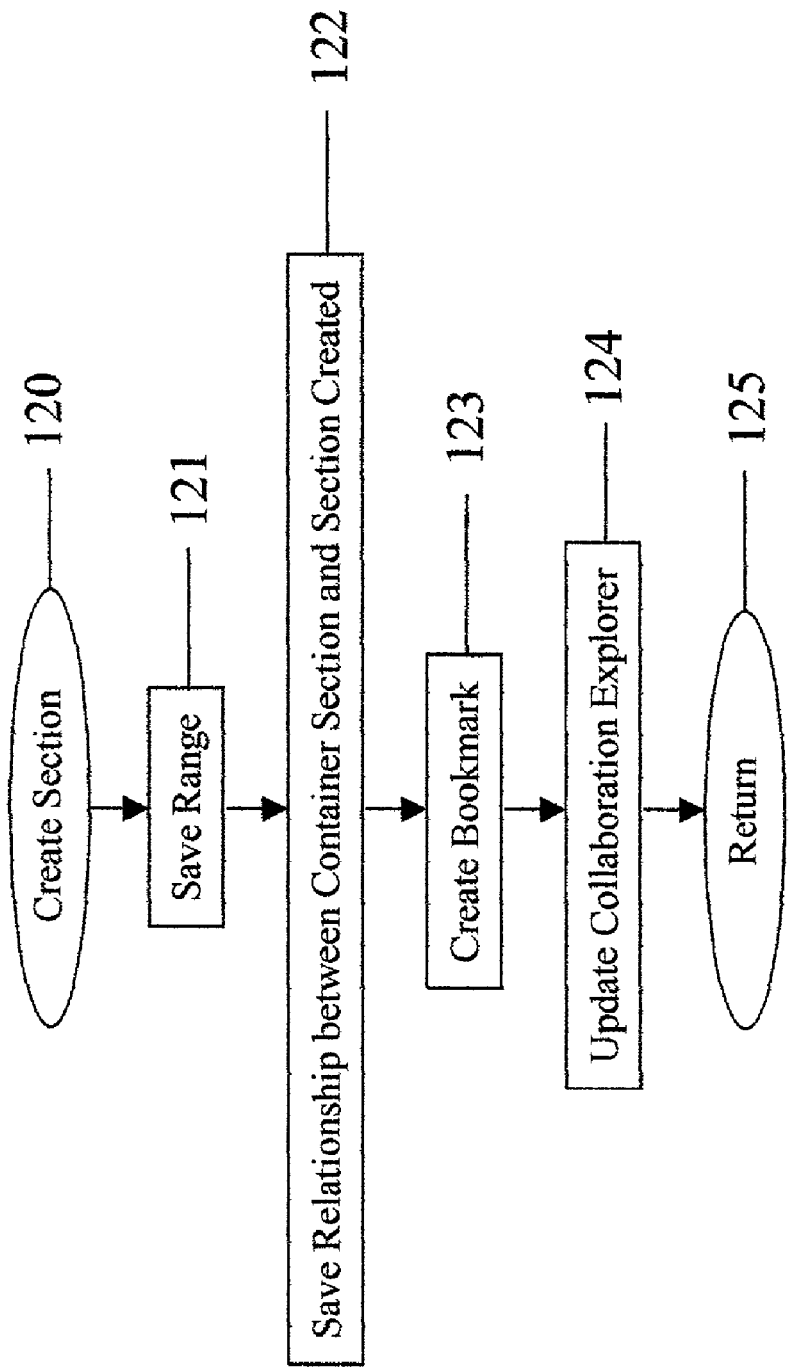
FIG. 11 illustrates a flowchart depicting the Create Section Operation.

Referring now to FIG. 11, there is illustrated a flowchart depicting the Create Section Operation. The operation is initiated at a block 120 and then proceeds to a function block 121 that causes the selected range to be saved. The program then flows to function block 122 that causes the relationship between the newly created section and the container section—the section or work product that contains the newly created section. The program then flows to function block 123 that causes a bookmark to be created with the work product that delineates the new section. The program then flows to function block 124 where the Collaboration Explorer is updated to show that a new section has been added and is under the participant's control. The program then flows to the return block 125.

Figure 12:
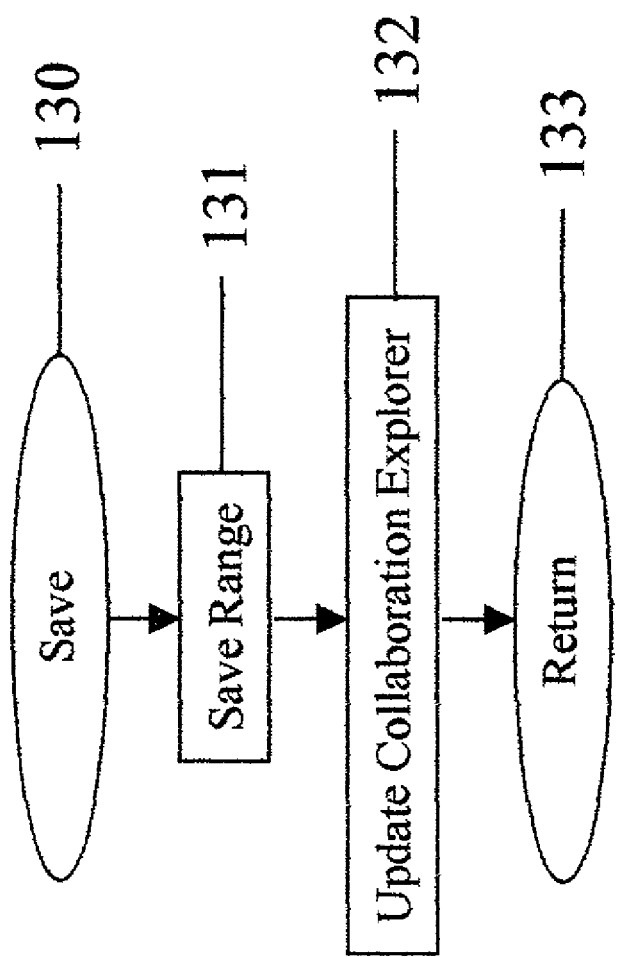
FIG. 12 illustrates a flowchart depicting the Save Operation.

Referring now to FIG. 12, there is illustrated a flowchart depicting the Save Operation. The operation is initiated at a block 130 and then proceeds to a function block 131 that causes the range of the selected section or whole work product to be saved. The program then flows to function block 132 where the Collaboration Explorer is updated to show other participants who may be logged in that there is a change in the section that a new section has been added. The program then flows to the return block 133.

Figure 13:
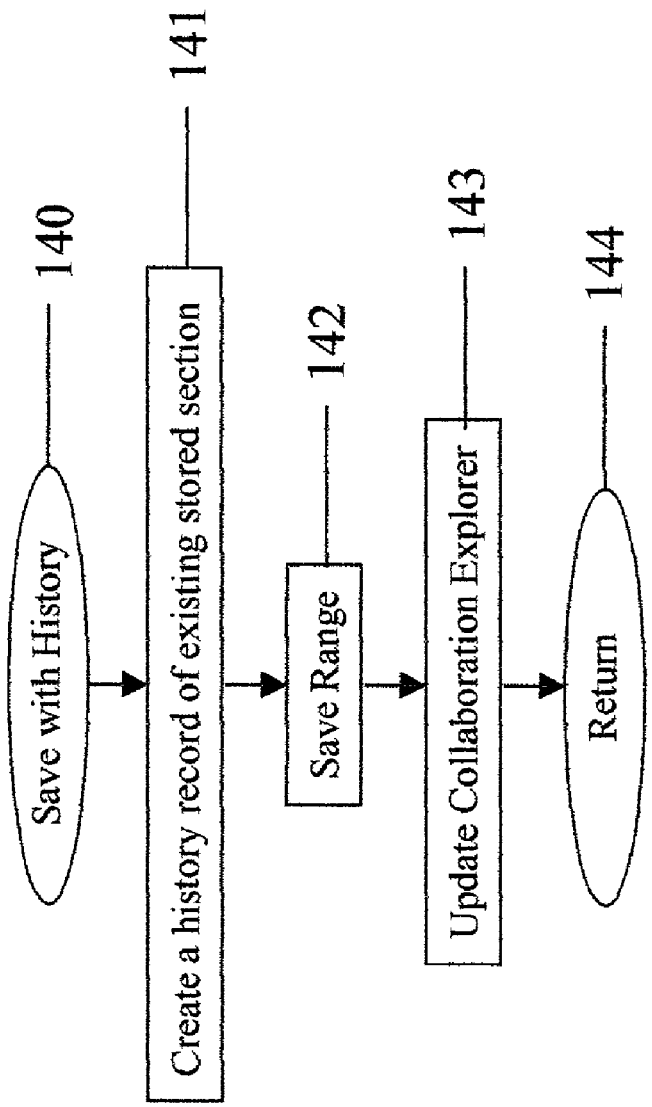
FIG. 13 illustrates a flowchart depicting the Save with History Operation.

Referring now to FIG. 13, there is illustrated a flowchart depicting the Save with History Operation. The operation is initiated at a block 140 and then proceeds to a function block 141 that causes a history record of the current stored section or work product to be created. The program then flows to a function block 142 that cause the range of the selected section or whole work product to be saved. The program then flows to function block 143 where the Collaboration Explorer is updated to show other participants who may be logged in that there is a change in the section that a new section has been added. The program then flows to the return block 144.

Figure 14:
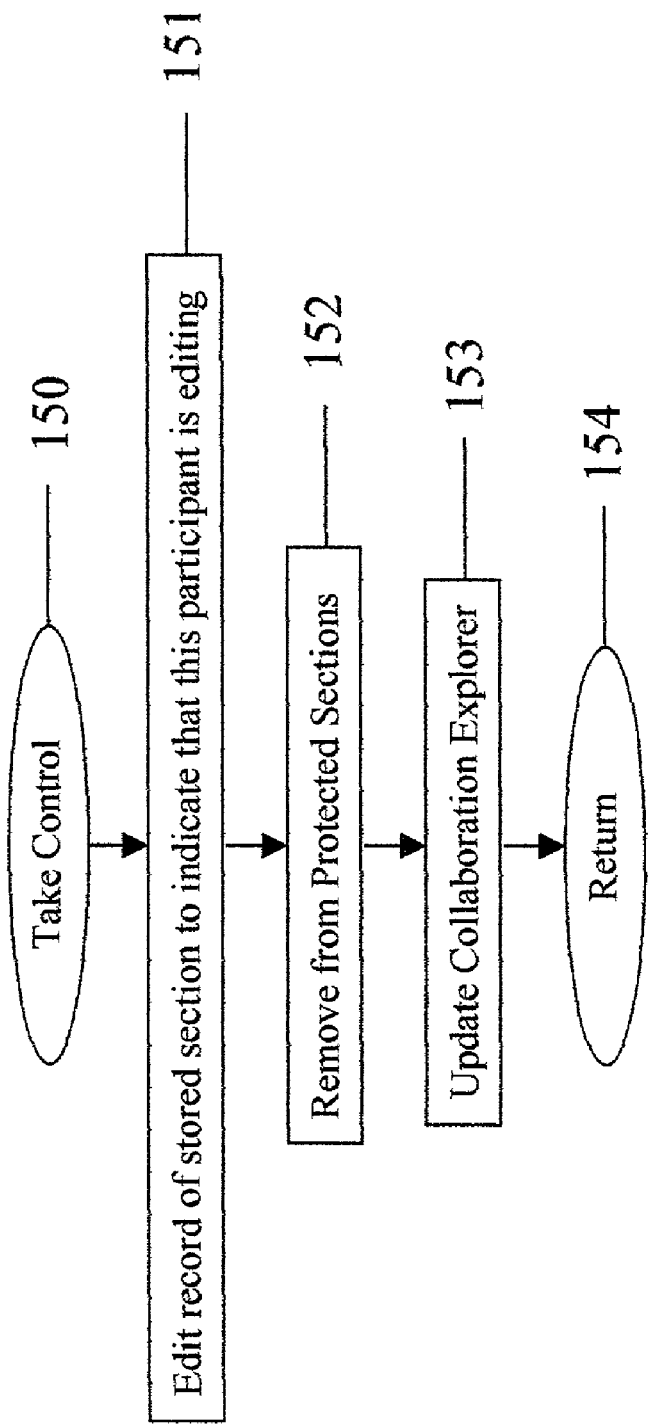
FIG. 14 illustrates a flowchart depicting the Take Control Operation.

Referring now to FIG. 14, there is illustrated a flowchart depicting the Take Control Operation. The operation is initiated at a block 150 and then proceeds to a function block 151 that causes the record of the stored section or work product itself to be modified to indicate that the section of work product is being edited by this participant. The program then flows to a function block 152 that causes the section or work product to be removed from the list of protected sections. The program then flows to function block 153 where the Collaboration Explorer is updated to show that the section or work product is now under control of this participant. The program then flows to the return block 154.

Figure 15:
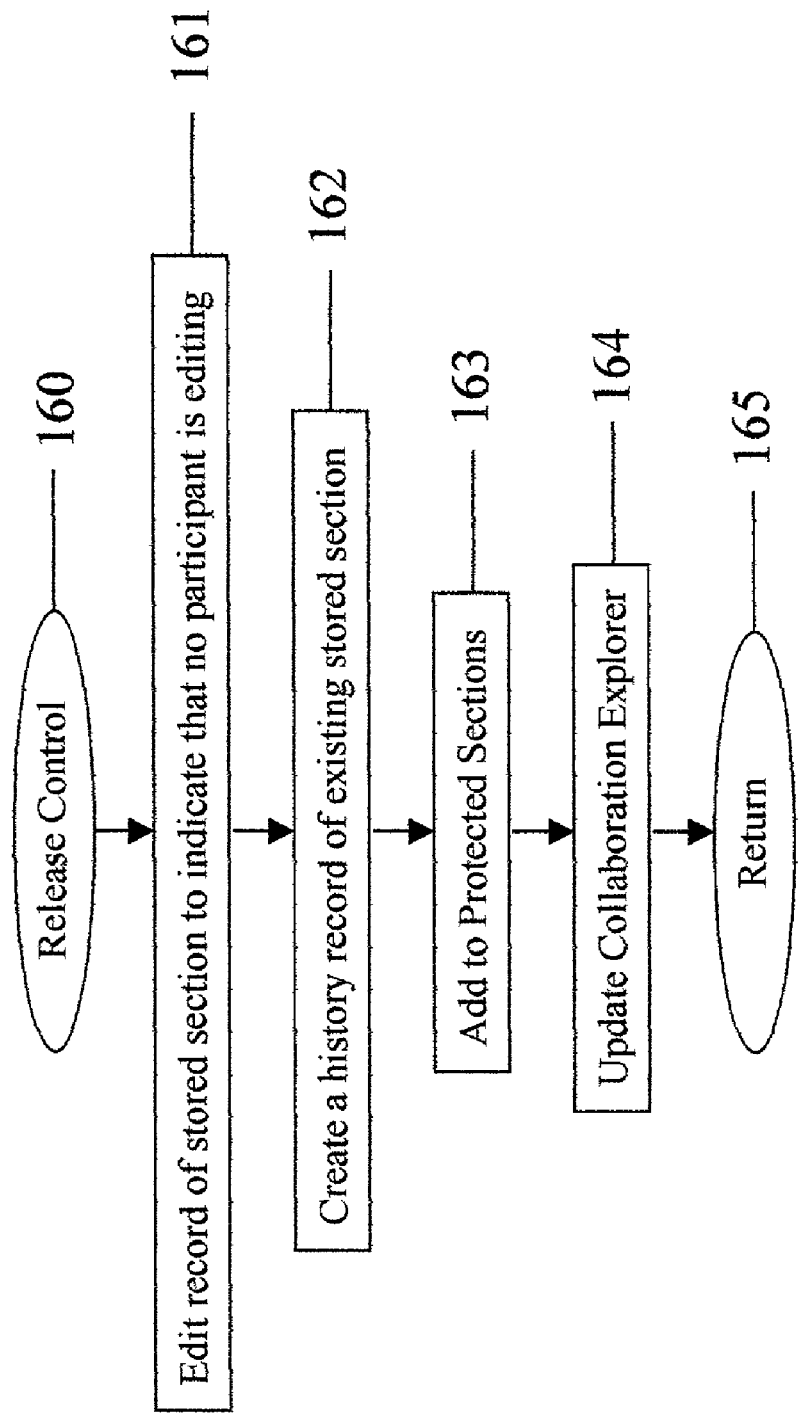
FIG. 15 illustrates a flowchart depicting the Release Control Operation.

Referring now to FIG. 15, there is illustrated a flowchart depicting the Release Control Operation. The operation is initiated at a block 160 and then proceeds to a function block 161 that causes the record of the stored section or work product itself to be modified to indicate that the section of work product is being edited by this participant. The program then flows to a function block 162 that causes a history record of the current stored section or work product to be created. The program then flows to a function block 163 that causes the section or work product to be added to the list of protected sections. The program then flows to function block 164 where the Collaboration Explorer is updated to show that the section or work product is now under no one's control. The program then flows to the return block 165.

Figure 16:
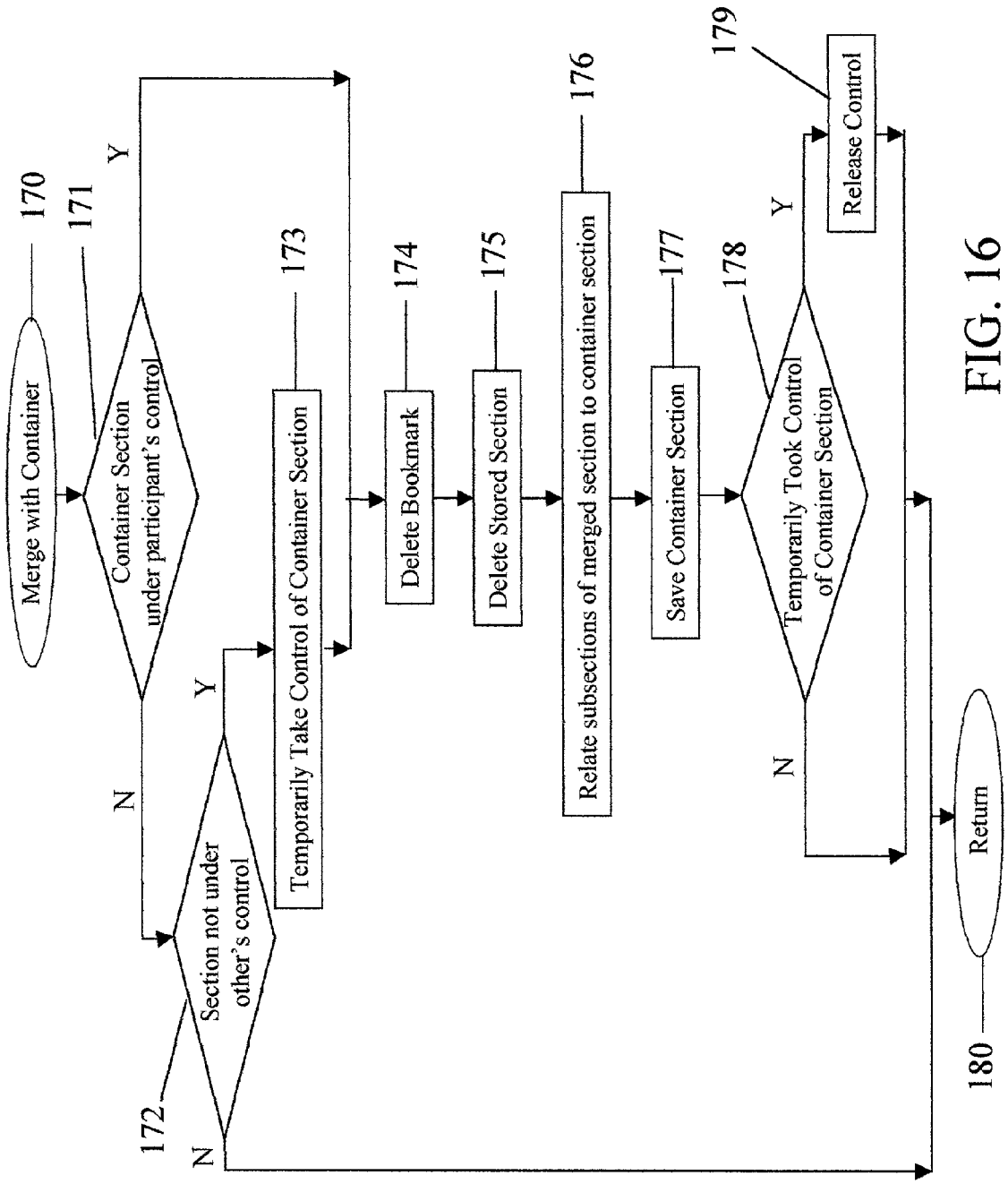
FIG. 16 illustrates a flowchart depicting the Merge with Container Operation.

Referring now to FIG. 16, there is illustrated a flowchart depicting the Merge with Container Operation. The operation is initiated at a block 170 and then proceeds to a decision block 171. The decision block 171 determines whether the container of the section to be merged is under the control of the participant. If so, the program would flow along the "Y" path to a function block 174 that causes the bookmark to be deleted within the work product. If not, the program would flow along the "N" path to decision block 172. The decision block 172 determines whether the container of the section is not under the control of another participant. If not under the control of another participant, the program would flow along the "Y" path to a launch block 173 that causes the container section to be temporarily taken under control by the participant. The program then flows to a function block 174 that causes the bookmark to be deleted within the work product. If the decision block 172 determines that the container of the section is under the control of another participant, the program then flows to a return block 180. If the program flows to a function block 174, it then flows to a function block 175 that causes the stored section is deleted. The program then flows to a function block 176 that causes any subsections of the deleted section to be related to the container section. The program then flows to a function block 177 that causes the container section to be saved. The program then flows to a decision block 178. The decision block 178 determines whether the container section was temporarily taken control. If so, the program would flow along the "Y" path to a launch block 179 that causes the release of the container section. In any case, the program then flows to a return block 180.

Figure 17:
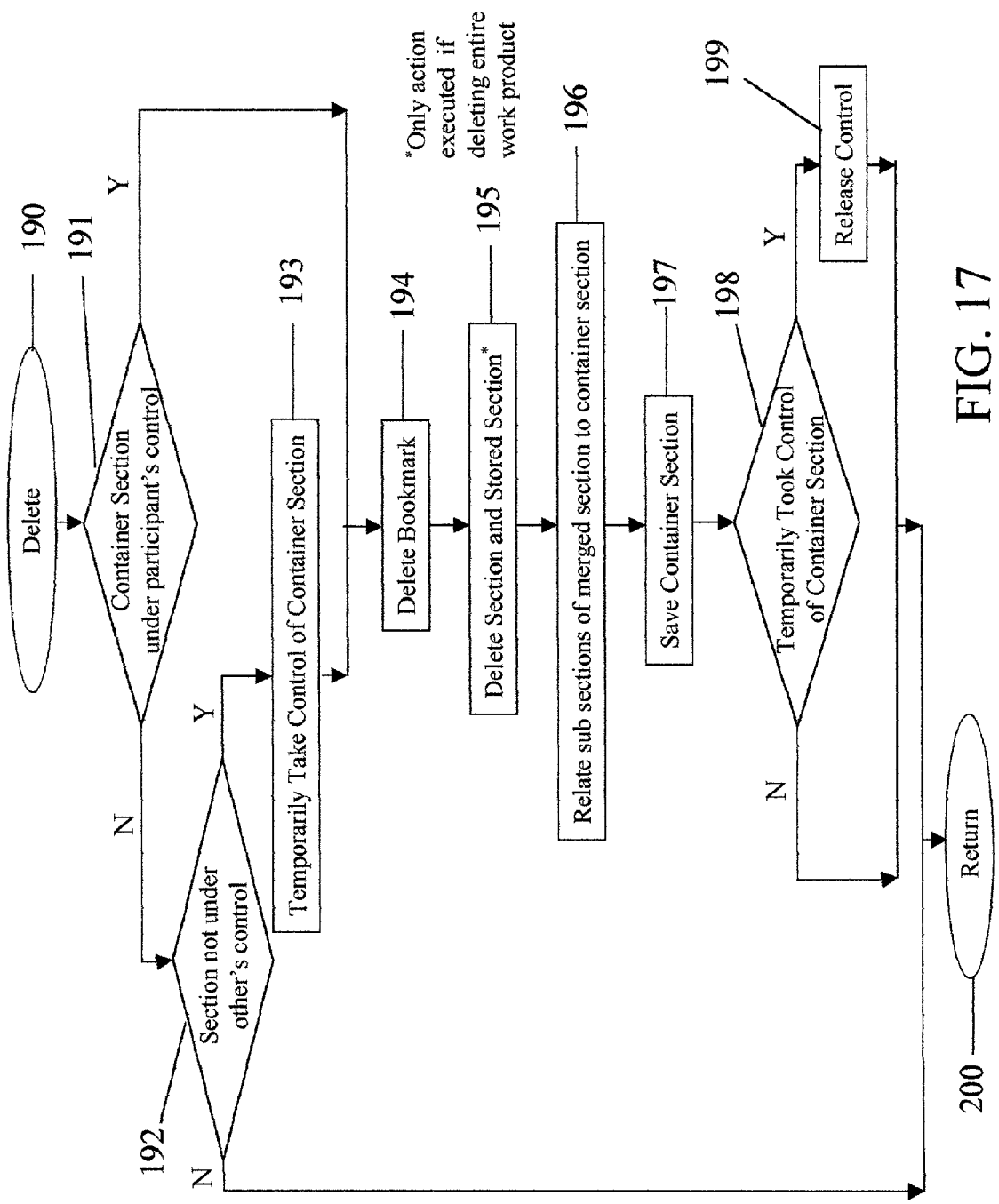
FIG. 17 illustrates a flowchart depicting the Delete Operation.

Referring now to FIG. 17, there is illustrated a flowchart depicting the Delete Operation. The operation is very similar to the Merge with Section except the section within the work product is deleted rather than merged with the container section. The operation is initiated at a block 190 and then proceeds to a decision block 191. The decision block 191 determines whether the container of the section to be merged is under the control of the participant. If so, the program would flow along the "Y" path to a function block 194 that causes the bookmark to be deleted within the work product.

If not, the program would flow along the "N" path to decision block 192. The decision block 192 determines whether the container of the section is not under the control of another participant. If not under the control of another participant, the program would flow along the "Y" path to a launch block 193 that causes the container section to be temporarily taken under control by the participant. The program then flows to a function block 194 that causes the bookmark to be deleted within the work product. If the decision block 192 determines that the container of the section is under the control of another participant, the program then flows to a return block 200. If the program flows to a function block 194, it then flows to a function block 195 that causes the section in the work product and the stored section to be deleted. As noted in FIG. 17, if the whole work product is deleted this is the only action executed. The program then flows to a function block 196 that causes any subsections of the deleted section to be related to the container section. The program then flows to a function block 197 that causes the container section to be saved. The program then flows to a decision block 198. The decision block 198 determines whether the container section was temporarily taken control. If so, the program would flow along the "Y" path to a launch block 199 that causes the release of the container section. In any case, the program then flows to a return block 200.

Figure 18:
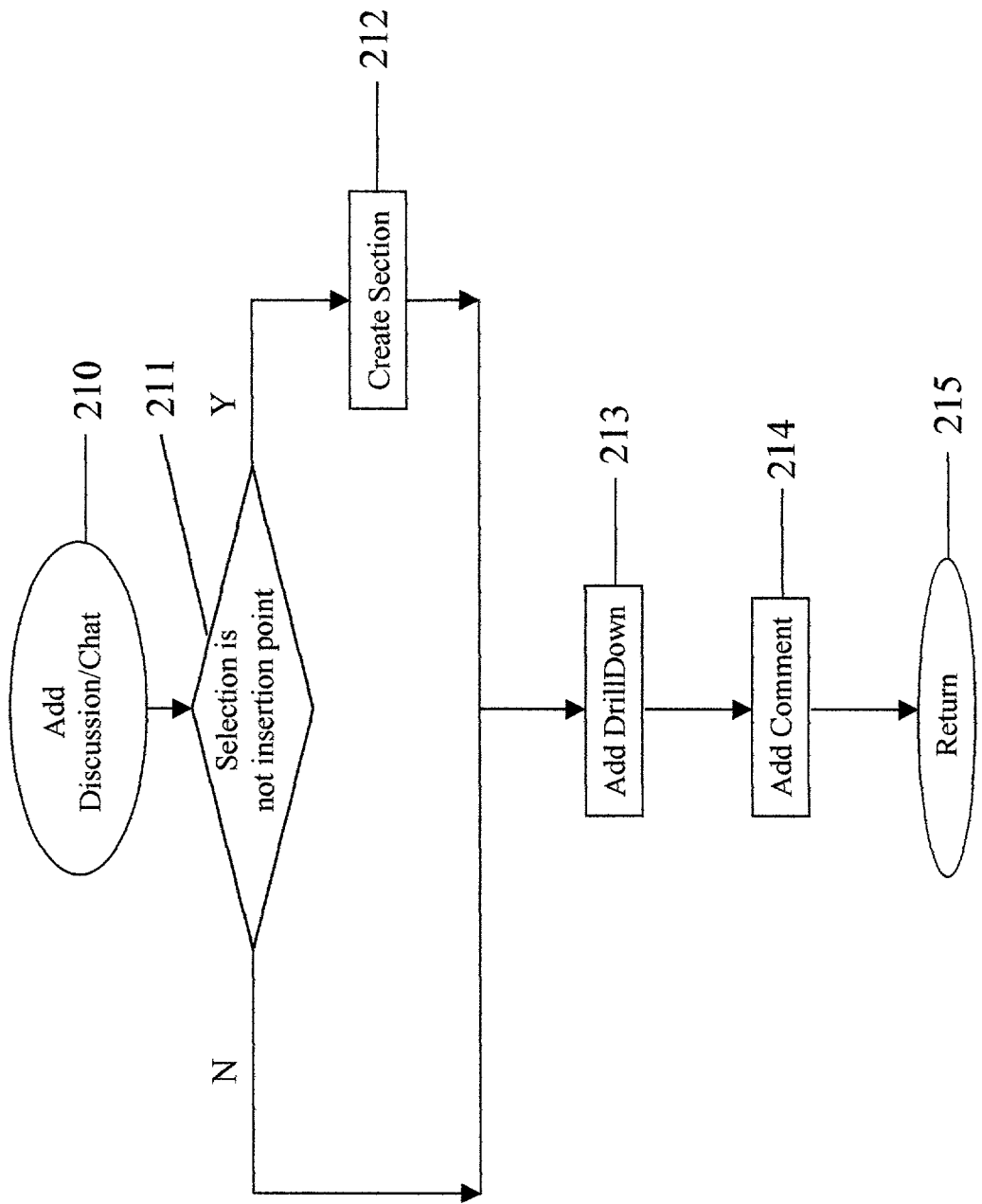
FIG. 18 illustrates a flowchart depicting the Add Discussion/Chat Operation.

Referring now to FIG. 18, there is illustrated a flowchart depicting the Add Discussion/Chat Operation. The operation is initiated at a block 210 and then proceeds to a decision block 211. The decision block 211 determines if the selection is not an insertion point. If not an insertion point, the program would flow along the "Y" path to a launch block 212 that causes a section to be created. In any case, the program would then flow to a launch block 213 that causes a drilldown document to be created. The program would then flow to a launch block 214 that causes a comment to be created. The program would then flow to a return block 215.

Figure 19:
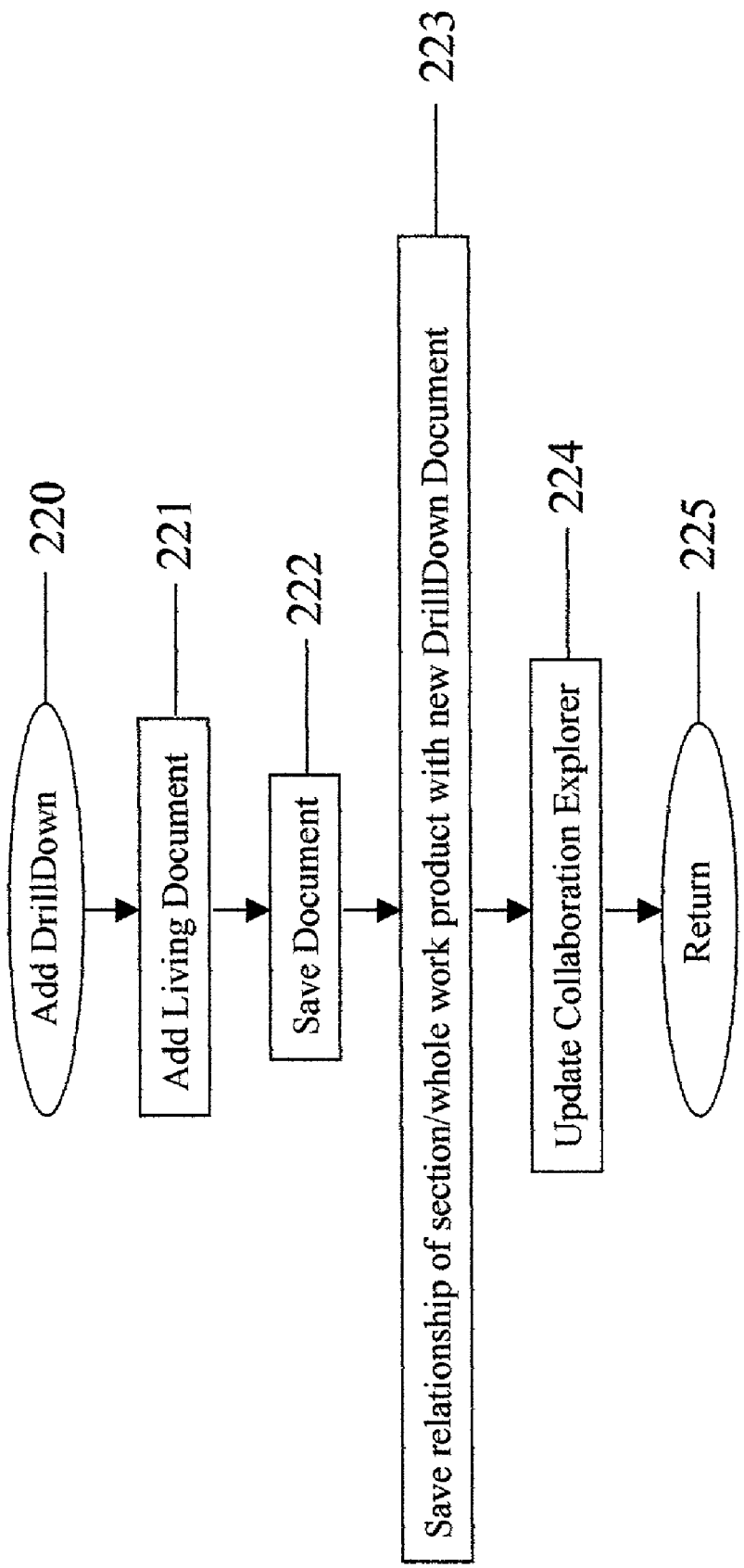
FIG. 19 illustrates a flowchart depicting the Add Drill-Down Operation.

Referring now to FIG. 19, there is illustrated a flowchart depicting the Add DrillDown Operation. The operation is initiated at a block 220. The program then flows to a function block 221 that causes a new work product like a document to be added. The program then flows to a launch block 222 that causes the document to be saved. The program then flows to a function block 223 that causes the relationship between the section or work product with the new drilldown document. The program then flows to a function block 224 that updates Collaboration Explorer with the new drill down that has been added. The program then flows to a return block 225.

Figure 20:
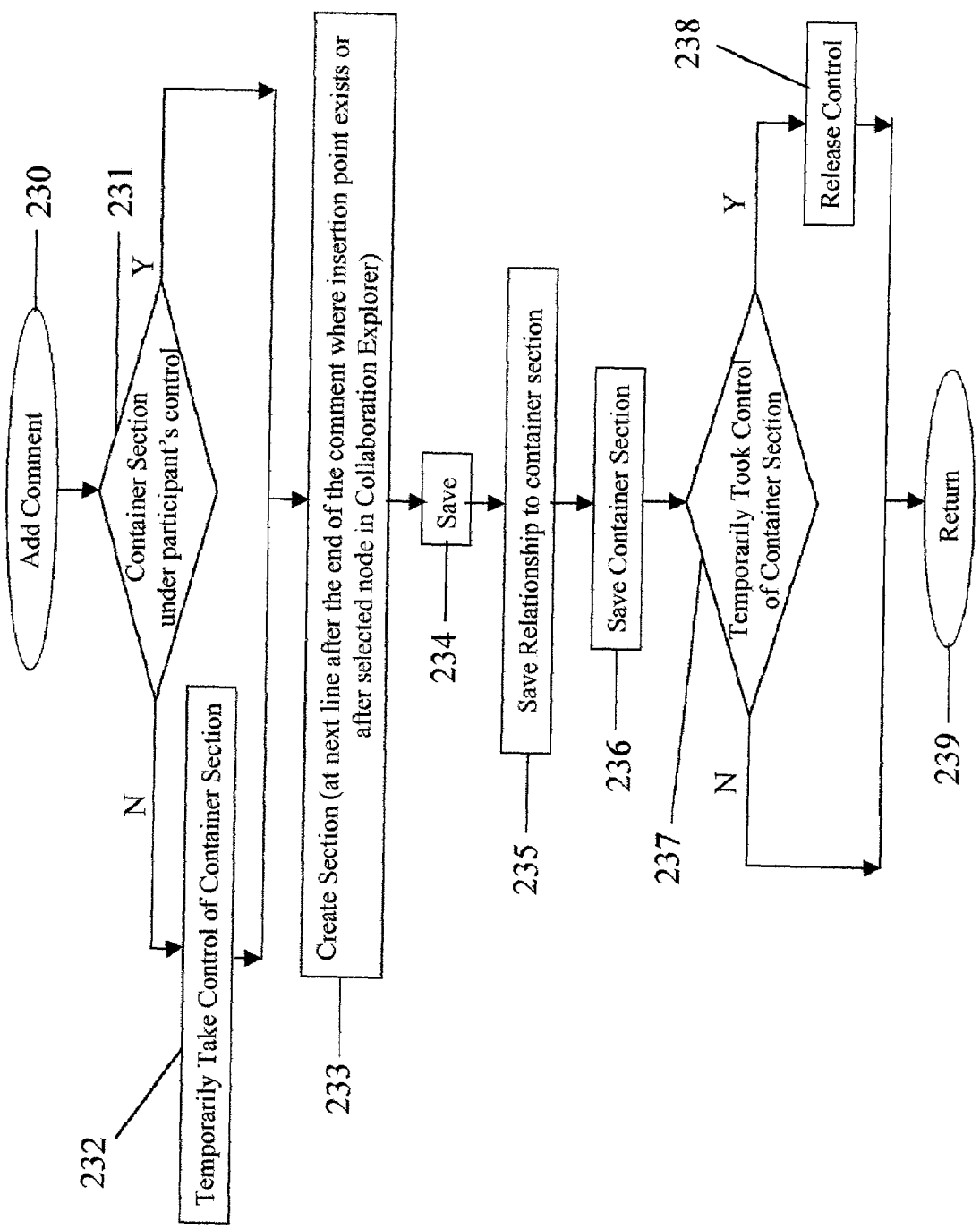
FIG. 20 illustrates a flowchart depicting the Add Comment Operation.

Referring now to FIG. 20, there is illustrated a flowchart depicting the Add Comment Operation. The operation is initiated at a block 230. The program then flows to a decision block 231. The decision block 231 determines if the Container Section is under the participant's control. If not, the program would flow along the "N" path to a launch block 232 that causes the Container Section to become under the control of the participant. In any case, the program would flow to a launch block 233 that causes a section to be created. The program would then flow a launch block 234 that causes the section to be saved. The program then flows to a function block 235 that causes the relationship between the new section and the Container Section to be saved. The program then flows to a launch block that causes the Container Section to be saved. The program then flows to a decision block 236. The decision block 236 determines if temporary control of the container section occurred. If so, the program would flow along the "Y" path to a launch block 237 that causes the container section to be released. In any case, the program would flow to a return block 239.

Figure 21:
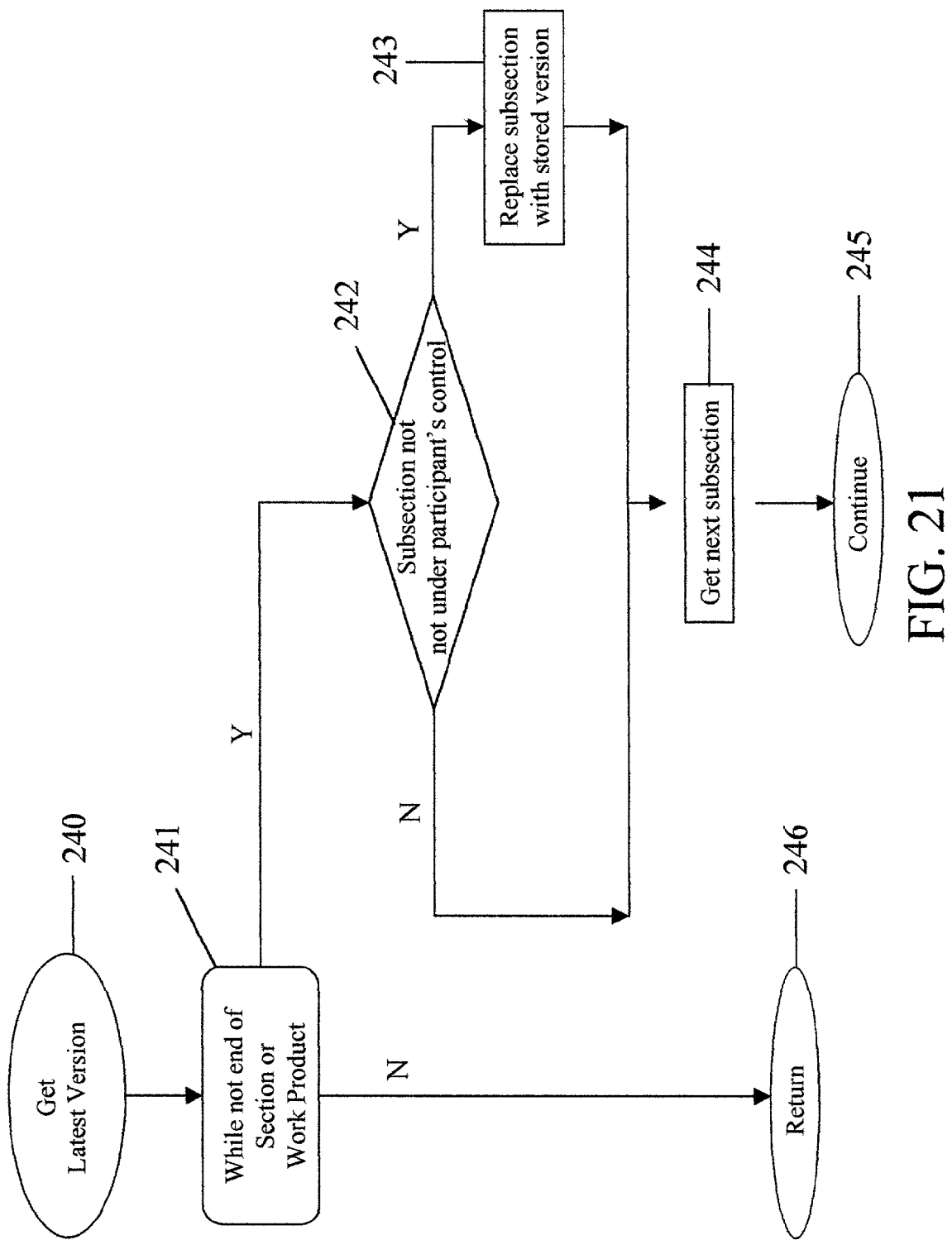
FIG. 21 illustrates a flowchart depicting the Get Latest Version Operation.

Referring now to FIG. 21, there is illustrated a flowchart depicting the Get Latest Version Operation. The operation is initiated at a block 240. The program then flows to a loop block 241. The loop block 241 determines if it is not the end of the section or work product for which the latest version is being retrieved. While this is true, the program would flow along the "Y" path to a decision block 242. The decision block 242 determines if the subsection is not under the participant's control. If not under the participant's control, the program would flow along the "Y" path to a function block 243 that causes the stored subsection to replace the subsection within the work product. In any case, the program would flow to a function block 244 that causes the next subsection to be retrieved. The program then flows to the continue block 245. The program then flows to the loop block 241. The loop block 241 determines if it is not the end of the section or work product for which the latest version is being retrieved. If false, the program would then flow along the "N" path to a return block 246.

In summary, there has been provided a Collaboration Engine, an architecture, that adds collaborative functionality to software. Although not limited to the following, the major collaborative work activities supported through Collaboration Engine include: project and work product management; shared work product creation and editing; and the capture of discussions and support statements related to the development of the shared work product. Collaboration Engine automatically recognizes when another person begins to work on the same work product and will provide automatic control and updates to other participants who log on and begin to work on the same work product. The end users interact with the shared work product enabled by the Collaboration Engine through the Collaboration Engine Interface. The Collaboration Engine Interface can be subdivided into two major ways that end users interface with Collaboration Engine Components. First is through a Collaboration Explorer that is placed in a docked window and the second is through the use of short cut menus directly within the shared work product. The Collaboration Explorer is used as a simple, intuitive, natural interface to manage projects, participants, and shared work products. A major innovation of Collaboration Engine is the way it enables collaborative interaction within a given work product by the ability to capture where a particular user is within a shared work product. The Key Capture Component captures key strokes and this information is passed to the Collaboration Handler which determines the allowed actions that a participant may perform at the time with the shared work product. The Collaboration Handler initiates actions with and responds to actions from both the Collaboration Explorer and directly through the shared work product. The Collaboration Engine Server interacts with a database in a conventional manner to persist information.

Although the preferred embodiment has been described in detail, it should be understood that various changes, substitutions, and alterations can be made therein without departing from the spirit and scope of the invention.

What is claimed is:

1. A method allowing a computer user to rip apart an existing software object into constituent parts, comprising: a) treating each part as an independent software object that is capable of being manipulated within a computer-based application that recognizes such software objects as valid, b) controlling each part separately, and c) automatically reconstituting the torn apart software object into a whole software object again made up of these parts as if there was no ripping apart of the object, but including any changes that may have been made to these separately controlled, independent parts.

2. The method of claim 1, further comprising the ability for different computer users to work simultaneously, in parallel, on the separately controlled parts.

3. The method of claim 1, further comprising the ability to divide the parts until subdividing is no longer possible which occurs when the part is no longer recognized by a computer-based application as a valid object to manipulate.

4. The method of claim 1, further comprising the ability to associate a part to other parts or objects.

5. The method of claim 1, further comprising the ability to associate an action to a part.

6. The method of claim 1, further comprising the ability to aggregate parts into a new object or part that contains the aggregated parts.

7. The method of claim 1, further comprising the ability to control who can work on a part.

8. The method of claim 1, further comprising the ability to control when work can be performed on a part.

9. The method of claim 1, further comprising the ability to control from where work can be performed on a part.

10. The method of claim 1, further comprising the ability to control how work can be performed on a part.

11. The method of claim 1, further comprising the ability to control work on a part based on why the work must be performed.

* * * * *